(12) United States Patent  
Kobayashi

(10) Patent No.: US 9,338,311 B2  
(45) Date of Patent: May 10, 2016

(54) IMAGE-RELATED HANDLING SUPPORT SYSTEM, INFORMATION PROCESSING APPARATUS, AND IMAGE-RELATED HANDLING SUPPORT METHOD

(75) Inventor: Tomoyuki Kobayashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/493,710

(22) Filed: Jun. 11, 2012

(65) Prior Publication Data

US 2012/0321131 A1 Dec. 20, 2012

(30) Foreign Application Priority Data

Jun. 14, 2011 (JP) ................................. 2011-132278  
May 17, 2012 (JP) ................................. 2012-113473

(51) Int. Cl.
| | |
|---|---|
| G06K 9/00 | (2006.01) |
| H04N 1/00 | (2006.01) |
| H04N 5/232 | (2006.01) |
| G06F 17/30 | (2006.01) |

(52) U.S. Cl.  
CPC ...... H04N 1/00183 (2013.01); G06F 17/30268 (2013.01); H04N 1/00244 (2013.01); H04N 5/23222 (2013.01); H04N 2201/0084 (2013.01)

(58) Field of Classification Search  
CPC combination set(s) only.  
See application file for complete search history.

(56) References Cited

U.S. PATENT DOCUMENTS

| | | | |
|---|---|---|---|
| 6,266,649 B1 | 7/2001 | Linden | |
| 7,451,161 B2 | 11/2008 | Zhu | |
| 8,095,432 B1 * | 1/2012 | Berman et al. | 705/26.7 |
| 8,161,069 B1 * | 4/2012 | Wilder et al. | 707/783 |
| 8,270,684 B2 * | 9/2012 | Kiyohara et al. | 382/118 |
| 8,472,662 B2 * | 6/2013 | Muriello et al. | 382/100 |
| 8,577,880 B1 * | 11/2013 | Donsbach et al. | 707/732 |
| 8,666,198 B2 * | 3/2014 | Shochat | G06K 9/00221 382/118 |
| 2004/0208475 A1 | 10/2004 | Ohmura | |
| 2005/0159970 A1 * | 7/2005 | Buyukkokten et al. | 705/1 |
| 2005/0172001 A1 * | 8/2005 | Zaner et al. | 709/205 |

(Continued)

FOREIGN PATENT DOCUMENTS

| | | |
|---|---|---|
| CN | 1524376 A | 8/2004 |
| CN | 1708092 A | 12/2005 |

(Continued)

OTHER PUBLICATIONS

Carolin Gerlitz et al. "Hit, Link, Like and Share. Organizing the social and the fabric of the web in a like economy" University of London, Paper at DMI mini-conference, Jan. 2011, hereinafter Gerlitz.*

(Continued)

*Primary Examiner* — Bhavesh Mehta  
*Assistant Examiner* — Oneal R Mistry  
(74) *Attorney, Agent, or Firm* — Canon U.S.A., Inc. IP Division

(57) ABSTRACT

An image handling support system extracts an image corresponding to a support target image from images associated with a user with use of information indicating association established between the user and the images, from a user's activity on an SNS. Then, the image handling support system supports handling of the support target image based on the extracted image. The image handling support system provides support for acquisition of an output image that matches various image conditions and complies with a user's preference without requiring a complicated operation to be performed in advance.

16 Claims, 22 Drawing Sheets

(56) References Cited

U.S. PATENT DOCUMENTS

| | | |
|---|---|---|
| 2006/0242139 A1 | 10/2006 | Butterfield |
| 2007/0103565 A1* | 5/2007 | Xu et al. .................... 348/231.2 |
| 2009/0006442 A1* | 1/2009 | Anderson et al. ............ 707/102 |
| 2009/0024548 A1 | 1/2009 | Zhu |
| 2009/0024591 A1* | 1/2009 | Miyasaka et al. ................. 707/3 |
| 2010/0074613 A1 | 3/2010 | Masuno |
| 2010/0100398 A1* | 4/2010 | Auker et al. ....................... 705/4 |
| 2010/0185580 A1 | 7/2010 | Zhu |
| 2010/0245596 A1 | 9/2010 | Tirpak |
| 2010/0280860 A1* | 11/2010 | Iskold et al. ....................... 705/7 |
| 2010/0287053 A1* | 11/2010 | Ganong et al. ............. 705/14.66 |
| 2012/0039513 A1* | 2/2012 | Kennedy et al. .............. 382/118 |
| 2012/0054277 A1* | 3/2012 | Gedikian ...................... 709/204 |
| 2012/0054666 A1* | 3/2012 | Baird-Smith .......... G06Q 10/10 715/780 |
| 2012/0054691 A1* | 3/2012 | Nurmi ........................... 715/854 |
| 2012/0062597 A1* | 3/2012 | Mori ............................. 345/636 |
| 2012/0072493 A1* | 3/2012 | Muriello ................ G06Q 50/01 709/204 |
| 2012/0072554 A1* | 3/2012 | Cao ..................... G06Q 30/0201 709/220 |
| 2012/0076367 A1* | 3/2012 | Tseng ........................... 382/118 |
| 2012/0092515 A1* | 4/2012 | Yim et al. ................... 348/222.1 |
| 2012/0116915 A1* | 5/2012 | Zheng ........................... 705/26.7 |
| 2012/0155759 A1* | 6/2012 | Kang et al. .................... 382/167 |
| 2012/0197709 A1* | 8/2012 | Kendall et al. ............. 705/14.36 |
| 2012/0229657 A1* | 9/2012 | Calman et al. .............. 348/207.1 |
| 2012/0246581 A1* | 9/2012 | Engestrom et al. ........... 715/753 |
| 2012/0250950 A1* | 10/2012 | Papakipos et al. ............ 382/118 |
| 2012/0278387 A1* | 11/2012 | Garcia et al. ................. 709/204 |
| 2012/0314917 A1* | 12/2012 | Kiyohara et al. ............. 382/118 |
| 2012/0324002 A1* | 12/2012 | Chen ............................. 709/204 |
| 2013/0046761 A1* | 2/2013 | Soderberg et al. ............ 707/736 |
| 2013/0279815 A1* | 10/2013 | Xu et al. ....................... 382/224 |

FOREIGN PATENT DOCUMENTS

| | | |
|---|---|---|
| JP | 2003-348519 A | 12/2003 |
| JP | 2007-27945 A | 2/2007 |
| JP | 2008-66886 A | 3/2008 |
| JP | 2008-236011 A | 10/2008 |
| JP | 2009-55088 A | 3/2009 |
| JP | 2011-123657 A | 6/2011 |
| JP | 2011-155385 A | 8/2011 |

OTHER PUBLICATIONS

XP55039860, Xiaoyuan Su et al., "A Survey of Collaborative Filterin Techniques", Hindawi Publishing Corp., Advances in Artificial Intelligence, vol. 2009, Article ID 421425, 19 pages.
XP031979688. Amiradha Widsinghe, et al., "picSEEK: Collaborative Filtering for Context-Based Image Recommendation", 978-1-4244-8551-2/10, 2010 IEEE pp. 225-232.
XP55039875, "Collaborative Filtering" from Wikipedia, 5 pages.
XP031356592, Patricia P. Wang et al., "Online Photography Assistance by Exploring Geo-referenced Photos on MID/UMPC", 978-1-4244-2295-1/08, 2008 IEEEE pp. 6-10.
The State Intellectual Property Office of P.R. China, Office Action, Jan. 16, 2015.
XP031865637. Wenyuan Yin, et al., "Contemporary Ubiquitous Media Services: Content Recommendation and Adaptation", 1st IEEE PerCom Workshop on Pervasive Communities and Service Clouds, Mar. 21, 2011, pp. 129-134.

* cited by examiner

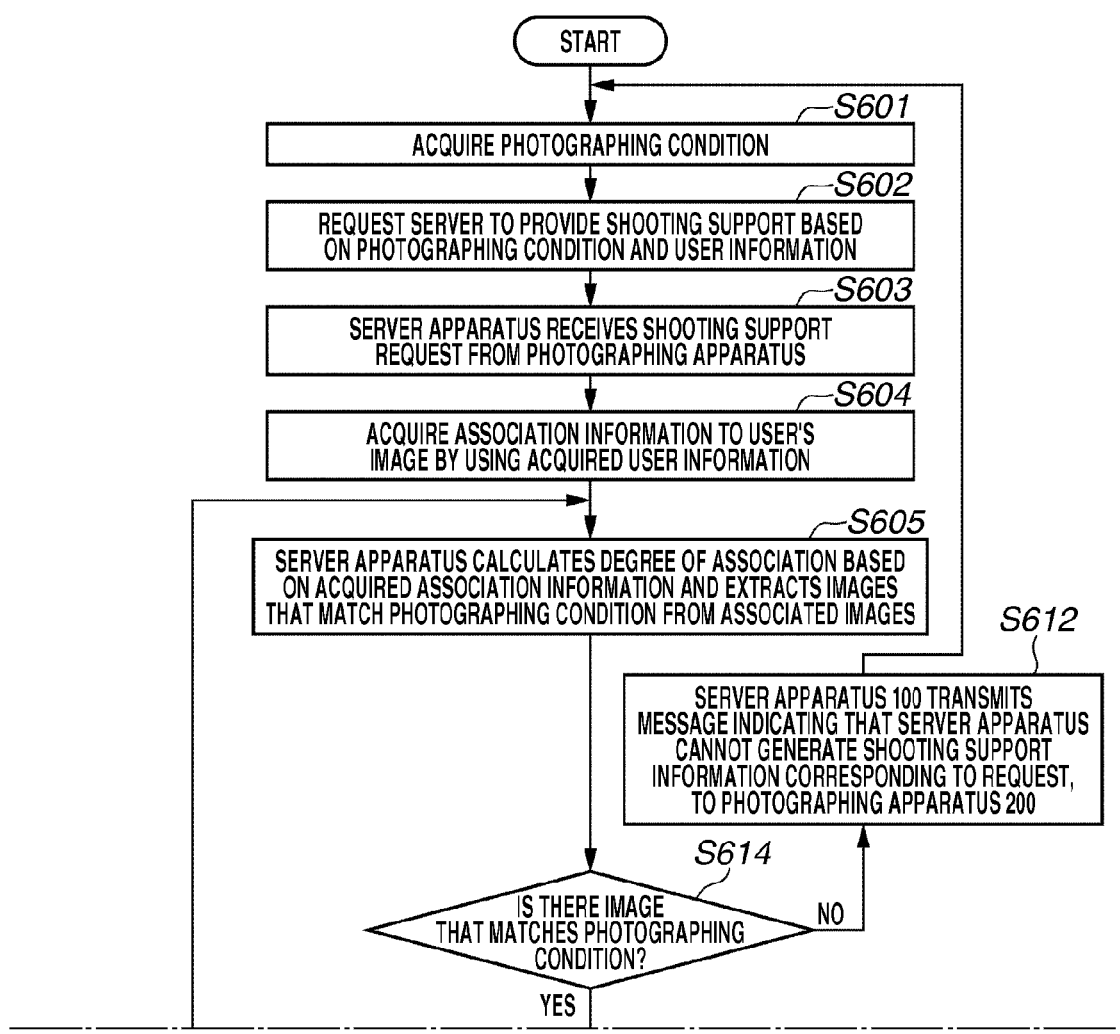

FIG.14

```
<Metadata>
        <Date>2011/10/2 10:00<Date>
        <Gps>N50 W10</Gps>
        <Object>Tokyo Tower</Object>
        <CameraSetting>
                <ISO>80/<ISO>
                <Focal>32</Focal>
        <CameraSetting>
</Metadata>
```

FIG.15A

| EVALUATED IMAGE 1501 | EVALUATED ANOTHER USER 1503 |
|---|---|
| IMAGE 1 | USER A (APPROVED TO BE PUBLISHED) |
| IMAGE 2 | USER C (APPROVED TO BE PUBLISHED) |

1502 brackets the IMAGE 1 / IMAGE 2 rows; 1504 brackets the USER A / USER C rows.

FIG.15B

| UPLOADED IMAGE 1505 | EVALUATED ANOTHER USER 1507 |
|---|---|
| IMAGE A-1 | USER B (APPROVED TO BE PUBLISHED) — 1508 |
| IMAGE A-2 | |

1506 brackets the IMAGE A-1 / IMAGE A-2 rows.

IMAGE-RELATED HANDLING SUPPORT SYSTEM, INFORMATION PROCESSING APPARATUS, AND IMAGE-RELATED HANDLING SUPPORT METHOD

BACKGROUND OF THE INVENTION

1. Field of the Invention

The present invention relates to a technique for supporting handling related to an image.

2. Description of the Related Art

As a technique for supporting a photographer's photographing operation, Japanese Patent Application Laid-Open No. 2008-236011 discusses a technique of allowing a photographer to manually generate a composition (photography guide) to shoot an image as the photographer wants, and displaying the composition superimposed on a preview image during a photographing operation. According to this technique, it is possible to provide support by the photography guide during the photographing operation so that the image can be captured in a composition close to the photographer's intended composition.

As another related invention, Japanese Patent Application Laid-Open No. 2007-27945 discusses a technique of displaying on a photographing apparatus a reference image corresponding to a photographing condition based on an input to the photographing apparatus or a sensor output of, for example, a Global Positioning System (GPS) to use the reference image as a sample composition, thereby supporting a photographing operation.

However, the method discussed in Japanese Patent Application Laid-Open No. 2008-236011 requires the photographer to generate a photography guide according to each photographing condition in advance, if a photographing operation is performed under various kinds of photographing conditions such as landscape, animal, and botanical photographing. Further, this method requires the photographer to carry out an additional process of selecting and setting a photography guide suitable to the current photographing condition.

On the other hand, the method discussed in Japanese Patent Application Laid-Open No. 2007-27945 can present a reference image suitable to the current photographing condition, but this reference image is an image prepared by a system provider in advance. Therefore, if photographing conditions are the same, a same reference image is uniformly presented to any user. Accordingly, it is impossible to realize presentation of a reference image according to the user's preference and interest. For example, it is impossible to select an image which complies with the user's preference and interest from among a plurality of images having different arrangement (composition) of an object respectively, to support a photographing operation.

SUMMARY OF THE INVENTION

The present invention is directed to providing support based on an image that matches various kinds of conditions and an image associated with a user.

According to an aspect of the present invention, an image handling support system includes an extraction unit configured to extract an image corresponding to a support target image based on information indicating association between a user and images from at least one of an image corresponding to another person that evaluates an image evaluated by the user, an image corresponding to another person evaluated by yet another person who is evaluated by the user, an image evaluated by another person corresponding to an image evaluated by the user, and an image corresponding to another person that evaluates an image corresponding to the user, and a support unit configured to support handling related to the support target image based on the image extracted by the extraction unit.

According to the present invention, it is possible to support a handling related to target image based on an image corresponding to the target image conditions and associated with a user.

Further features and aspects of the present invention will become apparent from the following detailed description of embodiments with reference to the attached drawings.

BRIEF DESCRIPTION OF THE DRAWINGS

The accompanying drawings illustrate embodiments, features, and aspects of the invention and, together with the description, serve to explain the principles of the invention.

FIG. 14 illustrates an example of metadata of an image.

FIGS. 15A and 15B each illustrate an example of association information.

DESCRIPTION OF THE EMBODIMENTS

Various embodiments, features, and aspects of the invention will be described in detail below with reference to the drawings. Each of the embodiments of the present invention described below can be implemented solely or as a combination of a plurality of the embodiments or features thereof where necessary or where the combination of elements or features from individual embodiments in a single embodiment is beneficial.

It should be noted that configurational details of embodiments of the present invention, which will be described later, are merely an example, and the present invention is not limited to the illustrated embodiments.

A first embodiment of the present invention supports a photographing operation with use of an image that matches a photographing condition currently set to a photographing apparatus and is associated with a user based on the user's preference and interest. Hereinafter, the first embodiment will be described with reference to the drawings.

Figure 3:
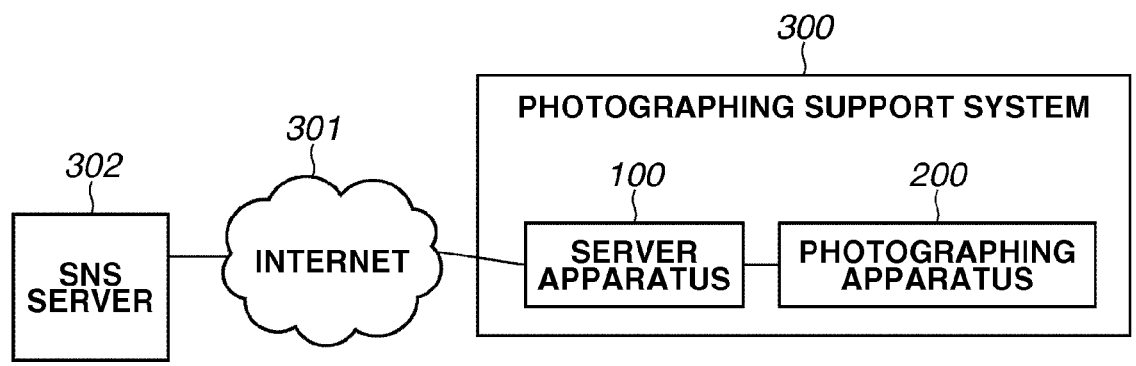
FIG. 3 illustrates an example of the system configuration.

The configuration of a photographing support system according to the present embodiment will be described with reference to FIG. 3. The photographing support system 300 according to the present embodiment includes a server apparatus 100 and a photographing apparatus 200 (a client apparatus). The server apparatus 100 is an information processing apparatus connected to a network such as an Internet 301 and capable of transmitting and receiving information. Further, a social networking service (SNS) server 302 is connected to the Internet 301, and the server apparatus 100 can transmit/receive information to/from the SNS server 302 via the Internet 301. The system configuration illustrate in FIG. 3 is merely an example, and each apparatus may be constituted by physically similar apparatuses or plural kinds of apparatuses.

Next, the configuration of the server apparatus 100 will be described with reference to the block diagram of FIG. 1. The server apparatus 100 according to the present embodiment may be realized by a single computer apparatus, or may be realized by distributing the respective functions among a plurality of computer apparatuses as necessary. In a case where the server apparatus 100 is constituted by a plurality of computer apparatuses, these apparatuses are connected via, for example, a local area network (LAN) so as to communicate with each other.

Figure 1:
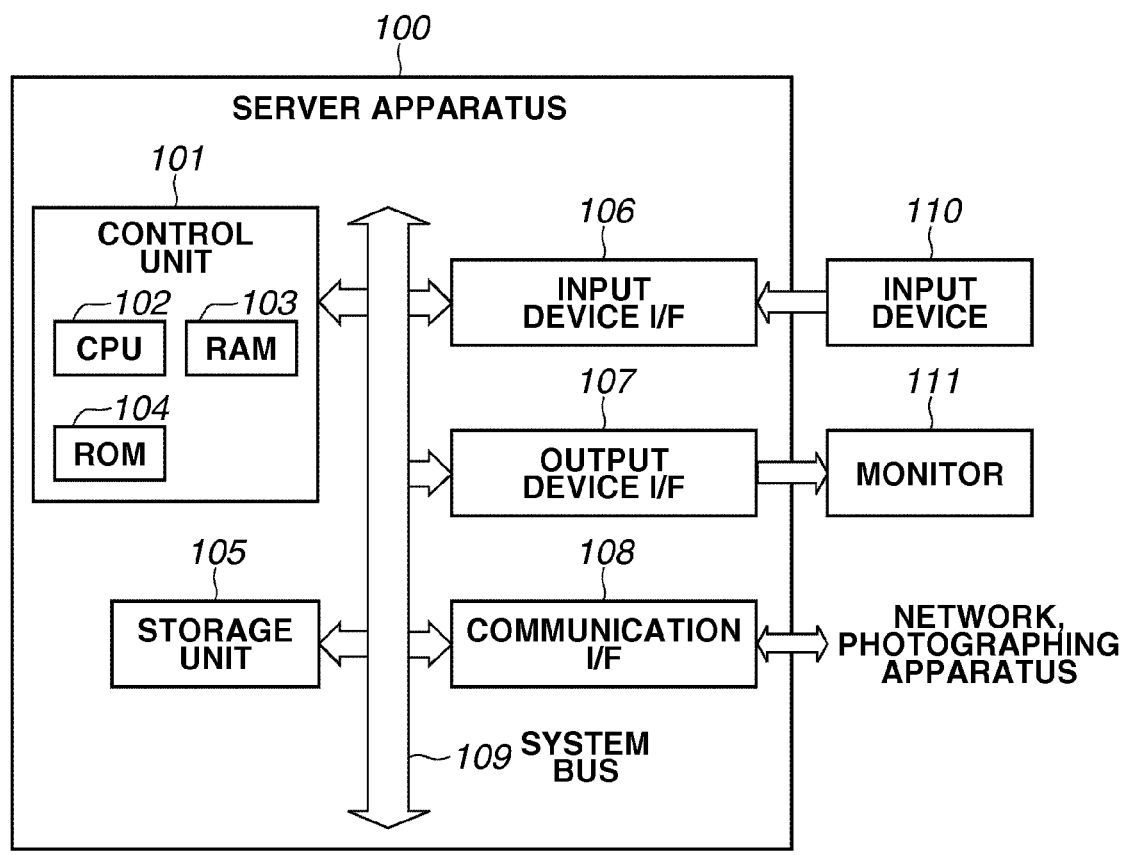
FIG. 1 illustrates an example of the configuration of a server apparatus.

Referring to FIG. 1, a control unit 101 is in charge of control of the whole server apparatus 100. The control unit 101 includes a central processing unit (CPU) 102, a random access memory (RAM) 103, and a read only memory (ROM) 104. The CPU 102 executes programs stored in the ROM 104 and a storage unit 105, which will be described later, to control each hardware apparatus and calculate information, thereby realizing processing and functional units which will be described later. The RAM 103 is a work memory of the CPU 102. The ROM 104 stores programs and parameters for realizing the processing and the functional units which will be described later.

The storage unit 105 is a storage apparatus such as a hard disk or a memory card mounted on the server apparatus 100, and stores data. The storage unit 105 may be incorporated in the server apparatus 100 or may be detachably configured. For example, the storage unit 105 may be embodied by, for example, an optical disk such as a flexible disk (FD) or a compact disk (CD), a magnetic card, an optical card, an integrated circuit (IC) card, or a memory card.

An input device interface 106 serves as an interface with an input device 110 such as a pointing device and a keyboard configured to receive a user's operation and accept an input of an instruction from the user. An output device interface 107 controls an input/output of information to/from an external apparatus such as a monitor 111 for displaying a video image output from the server apparatus 100. A network interface 108 enables communication with a network line and the photographing apparatus 200. A system bus 109 communicably connects the respective units 101 to 108.

Figure 2:
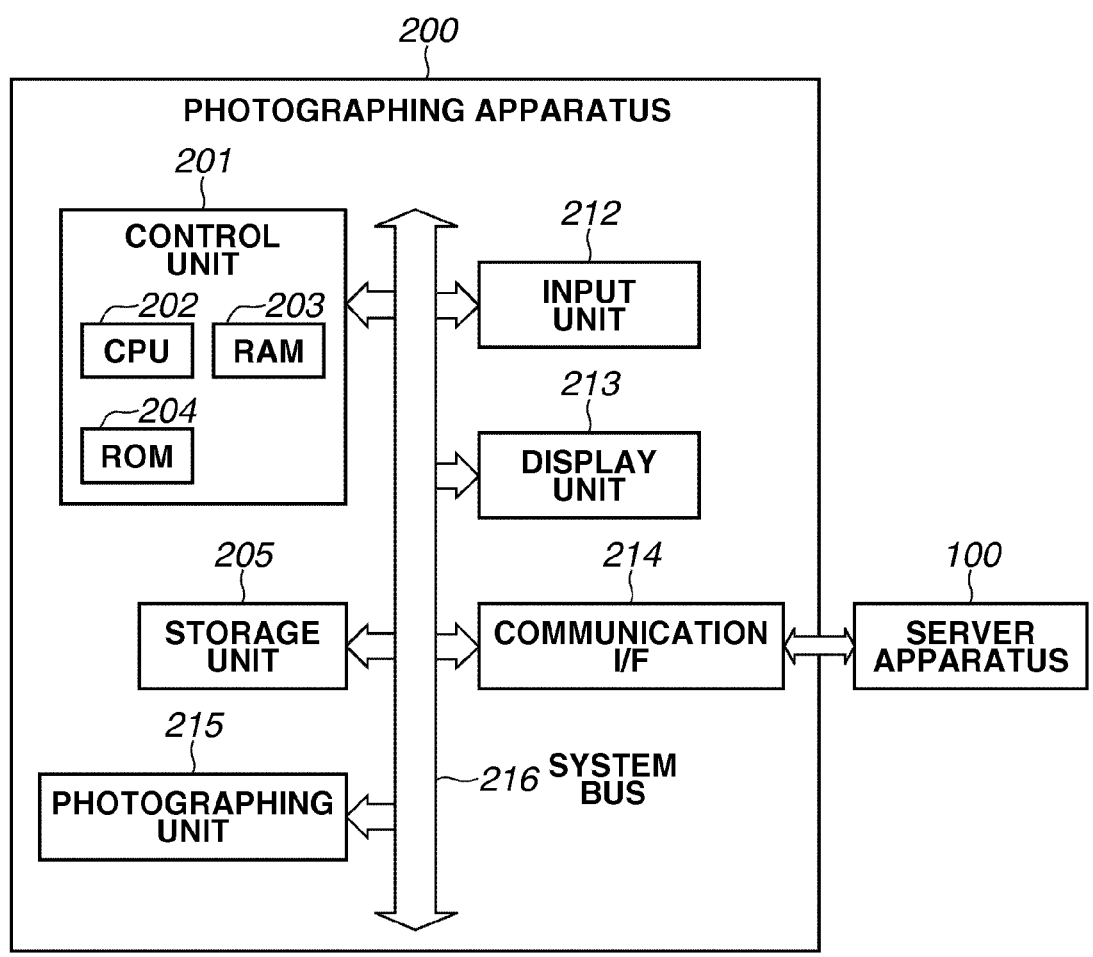
FIG. 2 illustrates an example of the configuration of a photographing apparatus.

Next, the configuration of the photographing apparatus 200 will be described with reference to the block diagram of FIG. 2. Referring to FIG. 2, a control unit 201 is in charge of control of the whole photographing apparatus 200. The control unit 201 includes a central processing unit (CPU) 202, a random access memory (RAM) 203, and a read only memory (ROM) 204. The CPU 202 executes programs stored in the ROM 204 and a storage unit 205, which will be described later, to control each hardware apparatus and calculate information, thereby realizing processing and functional units which will be described later. The RAM 203 is a work memory of the CPU 202. The ROM 204 stores programs and parameters for realizing the processing and the functional units which will be described later.

The storage unit 205 is a storage apparatus such as a hard disk or a memory card mounted on the photographing apparatus 200, and stores data. The storage unit 205 may be incorporated in the photographing apparatus 200 or may be detachably configured. The storage unit 205 may also be embodied by, for example, an IC card or a memory card.

An input unit 212 is, for example, a pointing device and a control key configured to receive a user's operation and input data. A display unit 213 is, for example, a liquid crystal display for displaying data and a graphical user interface (GUI) held by the photographing apparatus 200. The display unit 213 may be configured integrally with the input unit 212 as a touch panel.

A communication interface (I/F) 214 enables communication with an external apparatus such as a wireless LAN. The photographing apparatus 200 communicates with the server apparatus 100 via the communication I/F 214.

A photographing unit 215 includes, for example, a lens, an image sensor, and an analog/digital (A/D) convertor. The photographing unit 215 outputs light data of an object acquired via the lens as an electric signal by the image sensor, and converts the electric signal to digital data, thereby generating image data. A system bus 216 communicably connects each unit of the photographing apparatus 200.

Next, the SNS server 302, which is communicably connected to the above-described photographing support system 300 via the Internet 301, will be described. The SNS server 302 holds a plurality of images for use in photographing support, and information indicating association of a user of the photographing support system 300 with images established based on the user's preference and interest about, for example, picture formation and compositions of images.

The SNS server 302 is an information processing apparatus having a web server function for providing a social networking service (SNS) on the Internet 301. The SNS according to the present embodiment is configured in such a manner that each user can upload, for example, an image and a blog onto the SNS, and make an evaluation or a comment about uploaded images or other users. The SNS according to the present embodiment is a service that provides a place where users can communicate with each other through such exchanges. Further, a user can search for or view an image of another user having the same taste or preference by joining, for example, "a community" which other users having the same taste and preference belong to.

When a user registers himself/herself in the SNS, the user is provided with identification (ID), which uniquely indicates the user. The user is uniquely identified by this ID on the SNS. The user views an image uploaded by another user, and evaluates the viewed image based on the user's own preference and interest about, for example, picture formation and compositions of images. Further, the user can add another user to "my favorite (follow)" based on an image uploaded onto the SNS by another user, and monitor another user's activity. These activities on the SNS result in establishment of association between the users, or between the image and the user based on the preference and interest. Further, if the user joins "a community" based on the same preference about images, association can be established between the users based on the preference and the interest about images.

As an example of the evaluation about an image and a user, either two evaluations "like" (appreciation, preference) or "not like" can be assigned to an uploaded image by another user viewing that image. As the evaluation about an image and a user, the preference level may be expressed by a plurality of values in a stepwise manner. Further, the SNS server 302 can provide an external apparatus with information about association between a user and another user, information about association between a user and an image, and an image associated with a user, which are established through the above-described activities on the SNS.

The photographing support system 300 according to the present embodiment acquires, from the SNS server 302, association information indicating association between a user and another user and association between a user and an image based on an evaluation and a comment about an image, which are established on the SNS. The photographing support system 300 supports a photographing operation based on an image associated with a user on the SNS with reference to the information indicating association between the user and the image. The server apparatus 100 may store the association information in the storage unit 105 in advance, instead of acquiring the association information indicating the association with the user from the SNS server 302. Further, the photographing support system 300 may be configured in such a manner that the server apparatus 100 itself provides the SNS on the Internet.

Figure 4:
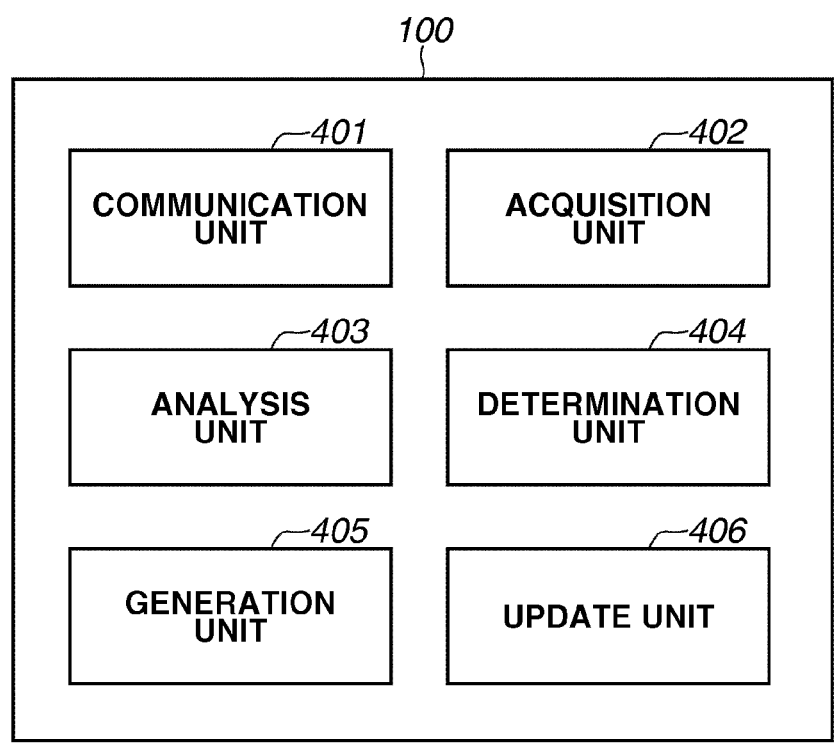
FIG. 4 illustrates an example of the functional configuration of the server apparatus.

Next, the functional configuration of the server apparatus 100 will be described with reference to FIG. 4. The server apparatus 100 is an apparatus for providing photographing support to a photographer. As illustrated in FIG. 4, the functional configuration of the server apparatus 100 includes a communication unit 401, an acquisition unit 402, an analysis unit 403, a determination unit 404, a generation unit 405, and an update unit 406. The control unit 101 calculates and processes information, and controls each hardware apparatus based on the control program, in which the respective functional units are realized. A part or all of the functional units illustrated in FIG. 4 may be constituted by hardware.

The communication unit 401 transmits/receives information to/from the photographing apparatus 200, and communicates with the Internet 301. The acquisition unit 402 acquires the association information indicating association between a user and images from the SNS server 302 on the Internet 301. The analysis unit 403 analyzes the association information acquired by the acquisition unit 402. Then, the analysis unit 403 calculates a degree of association between the user and an image reflecting the user's preference, taste, and interest based on the analysis result. The degree of association is a value indicating how much the image is associated with the user.

The determination unit 404 determines whether an image matches a specific photographing condition, from metadata attached to the image or a characteristic in the image for use in photographing support. In the present embodiment, the photographing condition is an operation condition such as an object, various kinds of parameters of the photographing apparatus 200, and a photography location when a photographer captures an image. The generation unit 405 generates shooting support information with use of the image that matches the photographing condition based on the result of the determination by the determination unit 404 and the result of the analysis performed on the association information by the analysis unit 403. The shooting support information includes the settings of various kinds of parameters of the photographing apparatus 200 during the photographing operation, and information for supporting construction of a photography composition. The update unit 406 updates the association information on the SNS server 302 based on a shooting support history, which indicates whether the photographing operation has been actually performed, with use of the generated shooting support information.

Figure 5:
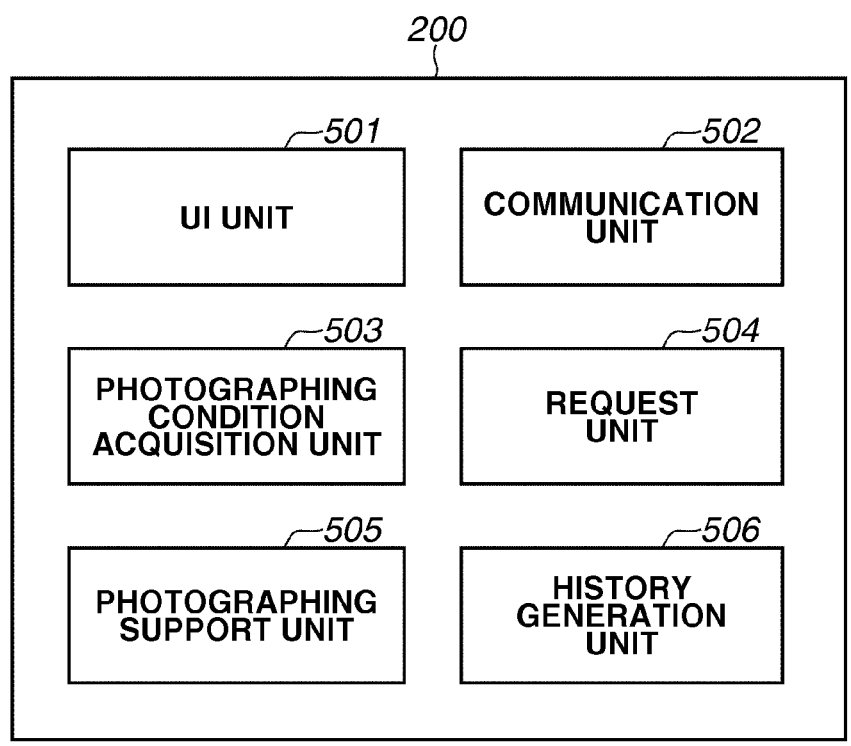
FIG. 5 illustrates an example of the functional configuration of the photographing apparatus.

Next, the functional configuration of the photographing apparatus 200 will be described with reference to FIG. 5. The photographing apparatus 200 can support a user's photographing operation based on the shooting support information acquired from the server apparatus 100. As illustrated in FIG. 5, the functional configuration of the photographing apparatus 200 includes a UI unit 501, a communication unit 502, a photographing condition acquisition unit 503, a request unit 504, a photographing support unit 505, and a history generation unit 506. The control unit 201 calculates and processes information, and controls each hardware apparatus based on the control program, to realize the respective functional units. A part or all of the functional units illustrated in FIG. 5 may also be constituted by hardware.

The UI unit 501 is an interface for enabling exchanges of information between the photographing apparatus 200 and a user. The communication unit 502 is in charge of communication with an external apparatus such as the server apparatus 100. The photographing condition acquisition unit 503 acquires a photographing condition. The request unit 504 generates information that contains the photographing condition acquired by the photographing condition acquisition unit 503 and user information uniquely indicating a photographer. Then, the request unit 504 requests the server apparatus 100 to provide photographing support. The photographing support unit 505 presents, to the photographer, the shooting support information that the server apparatus 100 generates in response to the request from the request unit 504. The photographing support unit 505 supports the photographer's photographing operation by presenting the shooting support information. The history generation unit 506 generates a shooting support information use history, which indicates whether the photographer has actually used the shooting support information.

How the thus-configured photographing support system 300 functions will be described below. Characteristic main processing of the photographing support system 300 includes photographer's photographing support processing and association information update processing. These kinds of processing will be described below with reference to the flowcharts illustrated in FIGS. 6 and 10.

Figure 6B:
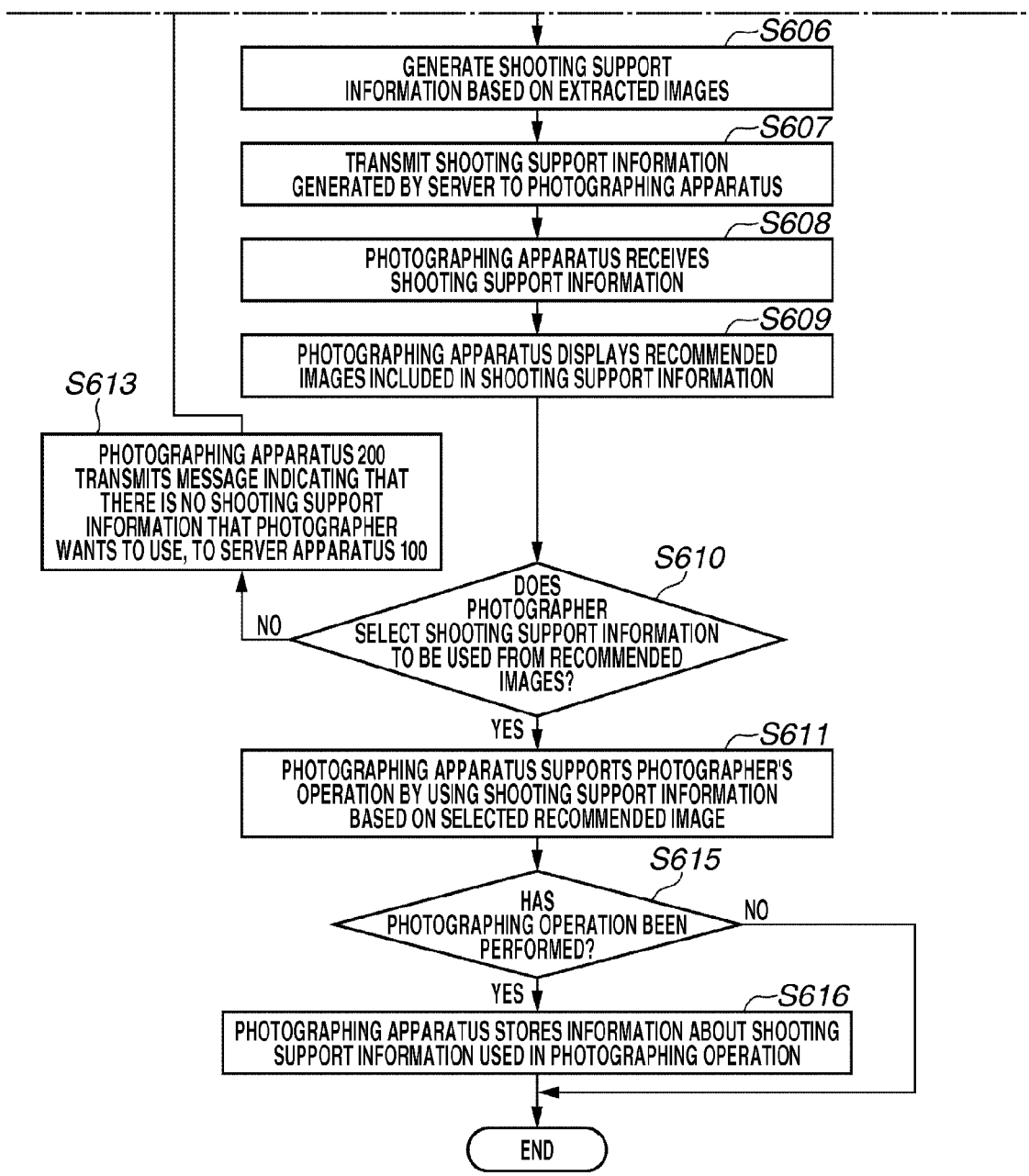
FIG. 6 is a flowchart illustrating photographing support processing.

First, the photographing support processing will be described with reference to FIG. 6. Upon a start of the photographing support processing, in step S601, the photographing condition acquisition unit 503 of the photographing apparatus 200 first detects a user's input to the UI unit 501, and acquires a photographing condition. At this time, the photographer inputs the photographing condition via the UI unit 501. In the present embodiment, a photographing mode is set as the photographing condition. Examples of photographing modes include a "portrait mode" for taking a picture of a person, a "landscape mode" for capturing a landscape image, a "night view mode" for capturing an image of night views, and a "macro mode" for photographing an object positioned close to the photographing apparatus 200. The user selects the photographing mode corresponding to an object that the user wants to photograph via the UI unit 501.

The present embodiment is described based on an example in which the photographing mode is set as the photographing condition, but the present invention is not limited thereto. For example, the photographing support system 300 may be configured in such a manner that an image analysis such as a color determination and object identification is applied to an image captured by preliminary photographing, and the photographing condition is automatically set based on this analysis result. Alternatively, positional information, which is an output of a GPS (global positioning system) sensor mounted on the photographing apparatus 200, for example, may be acquired as the photographing condition.

Subsequently, in step S602, the request unit 504 of the photographing apparatus 200 generates a shooting support request that contains the information about the photographing condition acquired as an output of step S601, and the information uniquely indicating the photographer acquired from a user's input to the UI unit 501. The user ID of the SNS server 302 is used as the information uniquely indicating the photographer.

The request unit 504 of the photographing apparatus 200 generates the shooting support request, and transmits this information to the server apparatus 100 via the communication unit 502 in step S602. In step S603, the server apparatus 100 receives the shooting support request. Subsequently, in step S604, the acquisition unit 402 of the server apparatus 100 accesses the SNS server 302 via the Internet 301. Then, the acquisition unit 402 acquires the association information of the photographer with use of the user ID contained in the shooting support request received in step S603. The SNS server 302 has the function of outputting the user's association information corresponding to an input user ID, to the input source.

FIGS. 15A and 15B each illustrate an example of the association information. In particular, FIG. 15A illustrates an example of association information indicating association between a user (photographer) of the photographing support system 300 and images generated from the user's activity on the SNS. A column 1501 contains an image to which the photographer provides a favorable comment or a favorable evaluation (appreciation, preference) about the image uploaded on the SNS. Items 1502 indicate IDs of images to which the photographer provides a favorable comment or a favorable evaluation.

A column 1503 contains another user to which, based on an image uploaded onto the SNS, the photographer provides a favorable comment or a favorable evaluation about another user that uploads this image. Items 1504 indicate user IDs of people that the photographer evaluates on the SNS. Further, the user IDs 1504 also include information indicating whether this user's association information is allowed to be published to other users. It is possible to further acquire the association information of the user ID 1504 by requesting this information to the SNS server 302 based on the user ID 1504 which can be published.

FIG. 15B illustrates the association information about "USER A" that the photographer evaluates. A column 1505 contains an image that the user A uploads on the SNS. Items 1506 indicate the IDs of images that the user A uploads on the SNS. Further, a column 1507 contains another user to which, based on an image uploaded on the SNS, the user A provides a favorable comment or a favorable evaluation about another user that uploads this image. An item 1508 indicates the user ID of a person that the user A evaluates on the SNS. The association information illustrated in FIGS. 15A and 15B are merely an example, and the photographing support system 300 may be configured to acquire the ID of the user that uploads the evaluated image 1501 or information about the community that the user joins. Further, the photographing support system 300 may be configured so as to add information about another user that evaluates an image uploaded by the photographer to the association information.

In this way, the association information is generated based on the evaluations that the photographer provides to images and people uploaded on the SNS. Therefore, it is considered that this information reflects the photographer's preference, taste, and interest about images. For example, an image evaluated by the photographer receives a favorable evaluation directly from the photographer himself/herself, and therefore should match the photographer's preference.

Further, the association information enables acquisition of information about an image uploaded or evaluated by a person having a similar preference, taste, and interest, to those of the photographer, such as an image held by another user who is evaluated by the photographer.

Further, the association information enables acquisition of information about an image uploaded or evaluated by a person having a similar preference, taste, and interest about images to those of the photographer, such as another user evaluated by another user evaluated by the photographer, and another user that evaluates an image evaluated by the photographer.

Figure 7:
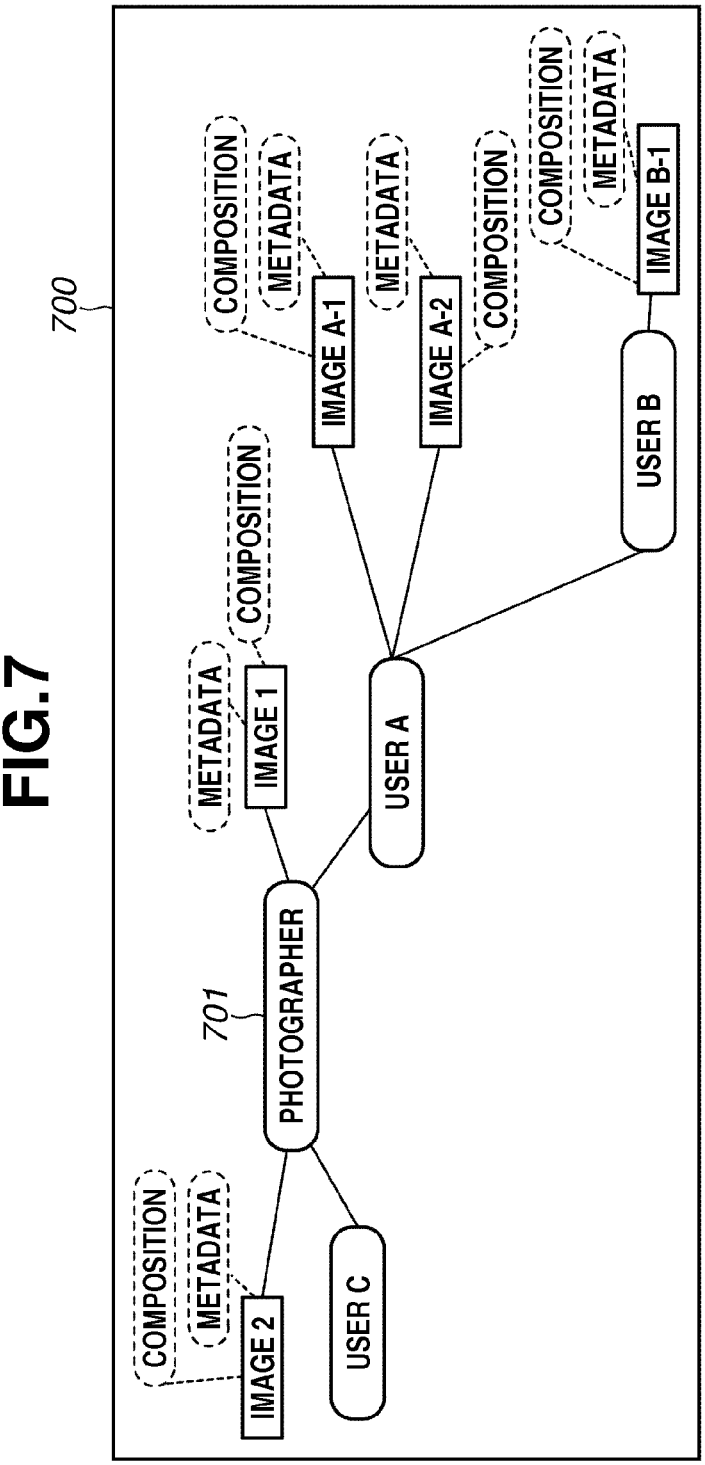
FIG. 7 illustrates an example of an association graph.

FIG. 7 is an association graph illustrating a degree of association of a photographer with another user or an image based on the acquired association information. An association graph 700 is a graph in which a photographer 701, other users active on the SNS, and images uploaded on the SNS are expressed as nodes and association is indicated with use of edges connecting the nodes. This graph indicates that there is association between nodes connected via an edge. Association is established between nodes by an activity on the SNS such as registering oneself to follow another user and providing a "like" evaluation to an uploaded image.

Subsequently, in step S605, the analysis unit 403 of the server apparatus 100 calculates a degree of association with an image on the SNS based on the acquired association information, and the determination unit 404 extracts images that match the photographing condition acquired in step S601 from associated images on the SNS. First, how to calculate degree of association between a photographer and an image on the SNS will be described. Assuming that n represents the number of hops between an arbitrary image node and the photographer node in the association graph 700 based on the acquired association information, a distance $S_n$ between the photographer node and the image away from the photographer node by n hops is expressed by the following equation.

$$S_n = n \quad (1)$$

This distance is set as the degree of association between the photographer and the image. The smaller the distance value, the more this image is associated with the photographer. For example, referring to the association graph 700, "IMAGE 1" and "IMAGE 2" are directly evaluated by the photographer 701 on the SNS, therefore are highly associated with the photographer 701, thereby being provided with the value "1" as the degree of association thereof. On the other hand, the value "2" is assigned as the degree of association to "IMAGE A-1" and "IMAGE A-2", which are images uploaded by "USER A" whom the photographer 701 evaluates as the person. On the other hand, the value "3" is assigned as the degree of association to "IMAGE B-1" uploaded by "USER B" evaluated by "USER A" who is evaluated by the photographer

701. In other words, "IMAGE B-1" is an image uploaded by "USER B", who is a person evaluated by "USER A" that uploads an image favorably evaluated by the photographer 701. Therefore, it is determined that "IMAGE B-1" is associated with the photographer 701, since it is highly likely to be an image that the photographer 701 favors.

Subsequently, the determination unit 404 extracts images that match the photographing condition acquired in step S601, from images on the SNS that are determined to be associated with the photographer. For each of images having a degree of association within a predetermined range set in advance, the determination unit 404 sequentially determines whether the image matches the photographing condition contained in the shooting support request, starting from an image having the highest degree of association. The images that match the photographing condition are selected as recommended images.

Here, the determination unit 404 determines whether the image matches the photographing condition by determining whether the image has an attribute corresponding to the photographing condition based on metadata of the image. FIG. 14 illustrates an example of a metadata description attached to an image. The information illustrated in FIG. 14 may be configured as same data as an image or may be managed as another data associated with an image.

Contents of metadata of an image include, for example, object information indicating the photographed object, date information indicating the date and time of photography, GPS information indicating the photography location, and camera setting information indicating settings of the photographing apparatus during the photographing operation.

Further, the photographing mode during the photographing operation is also added to the camera setting information. At least a part of these items in the metadata is attached to an image uploaded on the SNS in advance. This metadata may be automatically added by the photographing apparatus during the photographing operation or may be added by a user, for example, on the SNS.

In the present embodiment, the determination unit 404 determines whether an image matches the photographing condition depending on whether the image has an attribute corresponding to the photographing mode set as the photographing condition. The determination unit 404 refers to the photographing mode for the photographing operation, which is contained in the camera setting information in the metadata of an image, and determines whether this mode corresponds to the photographing mode set as the photographing condition.

The determination unit 404 may determine whether an image matches the photographing condition based on an attribute of the image other than the camera setting information. For example, in a case where the photographing mode "PORTRAIT" is set as the photographing condition, the determination unit 404 refers to the object information regarding the photographed object, and determines that the image matches the photographing condition if, for example, "HUMAN" or "FACE" are set as the object information of that image. The determination unit 404 holds a table indicating what kind of image attribute corresponds to each photographing condition in advance, and determines whether an image matches the photographing condition by referring to this table.

The present embodiment is described based on an example in which attributes of an image are acquired from metadata, but the present invention is not limited thereto. For example, attributes of an image may be acquired by execution of image analysis processing. In this case, the determination unit 404 determines whether an image matches the photographing condition depending on whether the image includes a color or an object corresponding to the photographing condition as a result of image analysis. For example, in a case where "LANDSCAPE MODE" is set as the photographing condition, the determination unit 404 applies image analysis to analyze the color of the upper area in the image, and determines that the image matches the photographing condition if the analyzed color is a color corresponding to the sky.

Further, the present embodiment is described based on an example in which a photographing mode is set as the photographing condition, but the present invention is not limited thereto. For example, in a case where a photography position is set as the photographing condition, the determination unit 404 may determine whether an image matches the photographing condition with use of the GPS information of the image. The determination unit 404 determines whether an image matches the photographing condition in the above-described manner.

Subsequently, in step S614, the determination unit 404 determines whether there is any image that matches the photographing condition among images having a degree of association within the arbitrary range set in advance in step S605. If there is no image that matches the photographing condition (NO in step S614), in step S612, the server apparatus 100 transmits a message indicating that the server apparatus cannot return the shooting support information, to the photographing apparatus 200. The photographing apparatus 200 displays the message on the UI unit 501. Then, the processing proceeds to step S601 again, which requests setting of a new photographing condition, and then steps thereafter are repeated based on this new photographing condition. Alternatively, the photographing support system 300 may be configured in such a manner that a determination is made again, expanding the target to include images having a lower degree of association, or photographing support is provided with use of an image stored in the server apparatus 100 in advance.

On the other hand, if it is determined in step S614 that there is an image that matches the photographing condition (YES in step S614), the processing proceeds to step S606. In step S606, if there are images that match the photographing condition (recommended images), the generation unit 405 of the server apparatus 100 generates the shooting support information based on the recommended images. One example of the shooting support information is generated based on, for example, information about various kinds of parameters described in the image metadata which is attributes of the recommended image, information about the composition of the image, and image characteristic information extracted from the recommended image. Further, the shooting support information contains the recommended image itself.

Further, the shooting support information may be information for automatically setting, for example, the zoom value and exposure information of the lens when the recommended image was photographed, to the photographing apparatus 200. Alternatively, the shooting support information may be information indicating the photography location or photography direction of the recommended image. Alternatively, the shooting support information may be information about the picture formation of the recommended image, or information about the composition. Further, even a group of recommended images itself may be set as the shooting support information. The above-described shooting support information is merely an example, and the present invention is not limited thereto.

Subsequently, in step S607, the communication unit 401 of the server apparatus 100 transmits the shooting support information generated in step S606 to the photographing apparatus 200. In step S608, the photographing apparatus 200 receives the shooting support information. Subsequently, in step S609, the photographing apparatus 200 presents the recommended images contained in the shooting support information received in step S608, on the UI unit 501.

Figure 8:
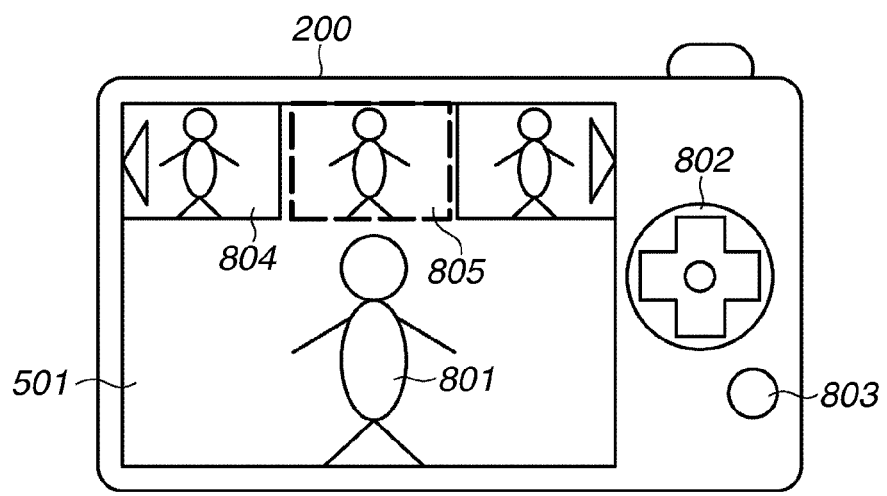
FIG. 8 illustrates an example of a user interface (UI) for allowing selection of a recommended image according to an embodiment of the present invention.

FIG. 8 illustrates an example of the presentation onto the UI unit 501. FIG. 8 illustrates an example of the UI unit 501 of the photographing apparatus 200, which includes a display screen 801, a physical key 802, and a determination button 803. A photography preview and a list of recommended images 804 are displayed on the display screen 801 in a superimposed state. In the list of recommended images 804, the recommended images are displayed in such a manner that they are sorted in descending order of the degree of association between the photographer and the recommended image. Since the list of recommended images 804 is displayed in such a manner that they are sorted in descending order of the degree of association based on the degree of association, the image having a high degree of association can be preferentially recommended.

In step S610, the photographer can move a selection cursor 805 to an arbitrary recommended image with use of the physical key 802 and then press the determination button 803, thereby selecting the recommended image. In the present embodiment, the photographer selects the image with use of the physical key 802, but may select the image with use of, for example, an UI that functions as a touch panel.

In step S610, the UI unit 501 determines whether the photographer selects the shooting support information to be used from the recommended images. If there is no image that the photographer wants to use (NO in step S610), the photographer operates the UI unit 501 to indicate this intention. Then, in step S613, the photographing apparatus 200 transmits a message indicating that there is no shooting support information that the photographer wants to use, to the server apparatus 100. Upon receiving this message, the server apparatus 100 resets the value of degree of association set in advance so that the recommended images can contain images having a lower degree of association. Then, step S605 and the steps thereafter are repeated.

Figure 9:
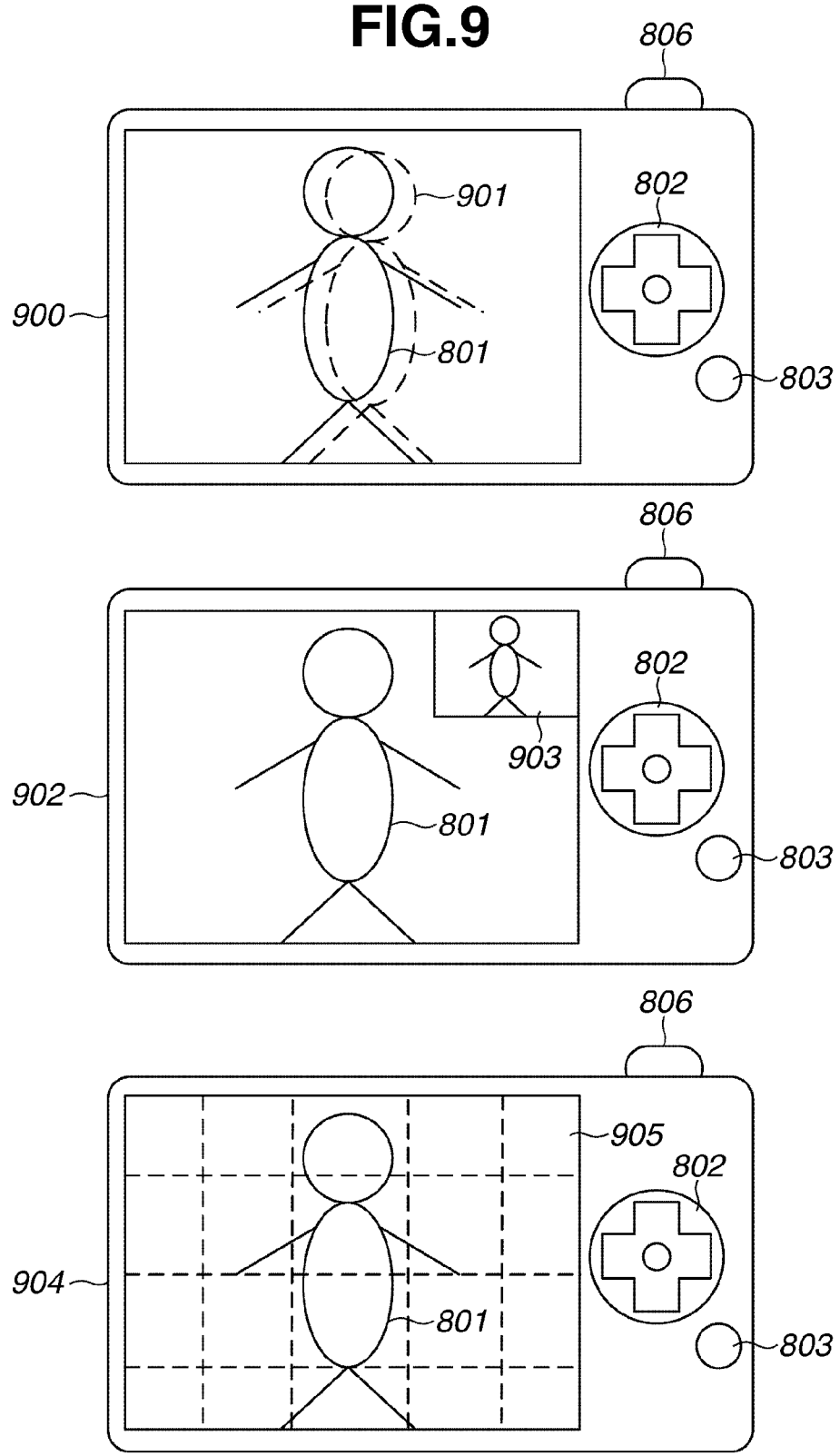
FIG. 9 illustrates an example of photographing support according to the embodiment of the present invention.

On the other hand, if the photographer selects an arbitrary image from the recommended images presented on the UI unit 501 in step S610 (YES in step S610), in step S611, the photographing support unit 505 of the photographing apparatus 200 provides photographing support with use of the shooting support information corresponding to the selected recommended image. An example of the photographing support will be described with reference to FIG. 9.

A photographing support mode 900 displays a composition 901 formed by extracting a contour component of the recommended image and a photography preview on the display screen 801 of the UI unit 501 in a superimposed state. The photographer photographs an image in such a manner that the object in the photography preview is aligned with the composition 901 of the recommended image. In this way, photographing support can be provided for acquiring an output as desired based on the composition of the recommended image.

Further, instead of the contour component in the recommended image, the original image of the recommended image may be displayed transparently, and be displayed together with the photography preview in a superimposed manner. A photographing support mode 902 displays a recommended image 903 at the corner of the display screen 801 on the UI unit 501 of the photographing apparatus 200. The photographing support mode 902 can support a photographing operation by allowing the photographer to take an image while viewing the recommended image, thereby acquiring a desired output similar to the recommended image.

A photographing support mode 904 can provide a grid on the display screen 801 on the UI unit 501 of the photographing apparatus 200, and can display the recommended image and the photography preview by switching them in response to an operation of the physical key 802. The photographing support mode 904 can support a photographing operation by allowing the photographer to display the photography preview and the recommended image by switching them, thereby acquiring adequate output similar to the recommended image.

The method for presenting shooting support information is not limited to the above-described methods. For example, the photographing apparatus 200 may support a photographing operation by, for example, navigating the photographer to a photography location with use of the photography location information or information about the direction and inclination of a terminal device that photographed the recommended image when the recommended image was photographed. For example, the photographing apparatus 200 can support a photographing operation by displaying a map on the UI unit 501, and indicating the current position of the photographing apparatus 200 and the position and photography direction where the recommended image was photographed, thereby allowing the photographer to photograph an image at the photography location where the recommended image was photographed.

Further, the photographing apparatus 200 may be configured to change the settings of the photographing apparatus 200 to generate a similar image to the recommended image with use of the settings of the photographing apparatus when the recommended image was photographed and information about the picture formation of the recommended image. Returning to FIG. 6, in step S611, the photographing support unit 505 of the photographing apparatus 200 provides photographing support. After that, if it is determined in step S615 that a photographing operation has been actually performed (YES in step S615), in step S616, the photographing apparatus 200 stores information about the shooting support information used in the photographing operation. Then, the processing is ended.

Next, association information update processing will be described. It is considered that the recommended image actually used by the photographer as photographing support is an image that furthermore matches the photographer's preference and taste. The association information on the SNS is updated with use of this information to further reflect the photographer's preference and taste.

Figure 10:
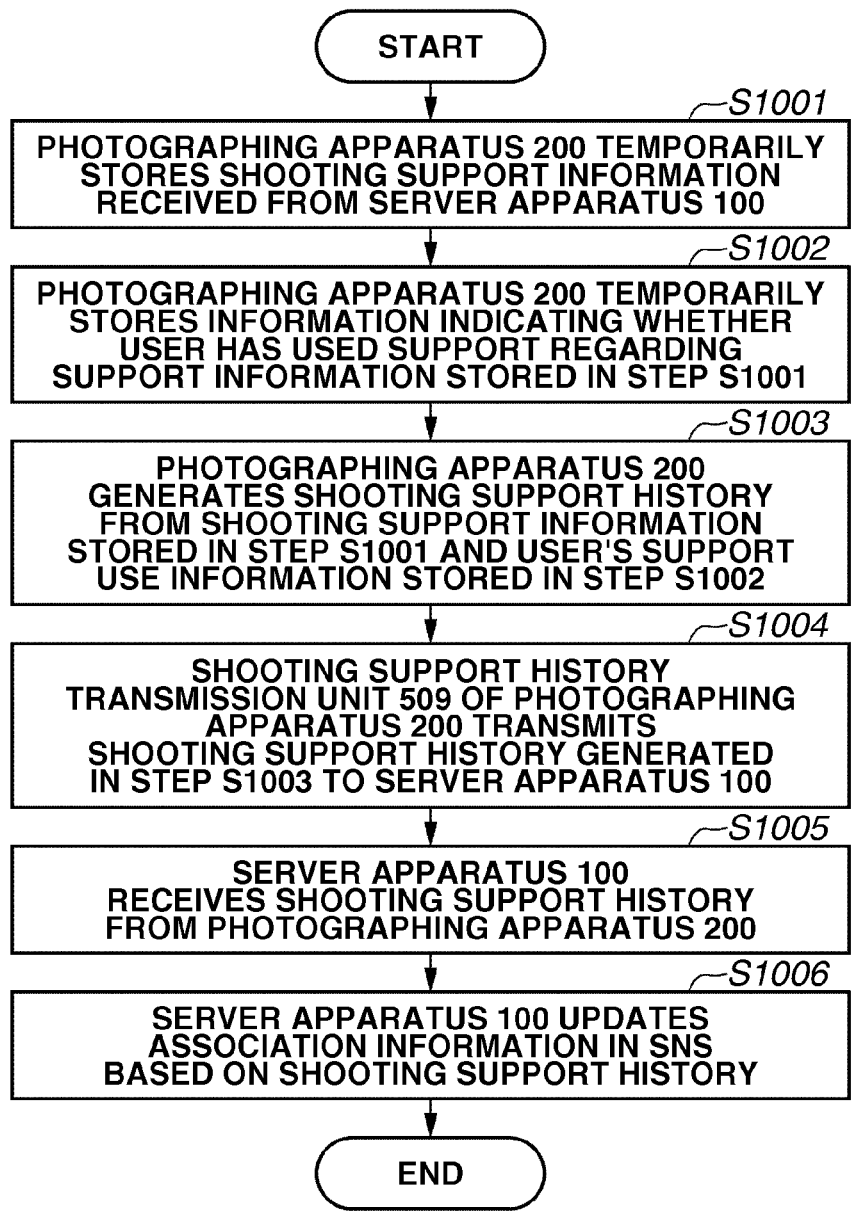
FIG. 10 is a flowchart illustrating association information update processing.

The association information update processing will be described with reference to the flowchart of FIG. 10. First, in step S1001, the photographing apparatus 200 stores the shooting support information received from the server apparatus 100. Further, in step S1002 (step S616 in FIG. 6), the photographing apparatus 200 stores information indicating whether the photographer has photographed an image with use of this shooting support information. In step S1003, the history generation unit 506 of the photographing apparatus 200 sets information indicating whether the photographer has photographed an image with use of the shooting support information for each piece of shooting support information based on each of a plurality of recommended images, thereby generating a shooting support history.

In step S1004, the communication unit 502 of the photographing apparatus 200 transmits the shooting support history generated in step S1003 to the server apparatus 100. In step S1005, the communication unit 401 of the server apparatus 100 receives the shooting support history. Subsequently, in step S1006, the update unit 406 of the server apparatus 100 communicates with the SNS server 302 via the communication unit 401, and updates the association information to further reflect the user's preference at the time of the shooting support based on the shooting support history information.

Figure 11:
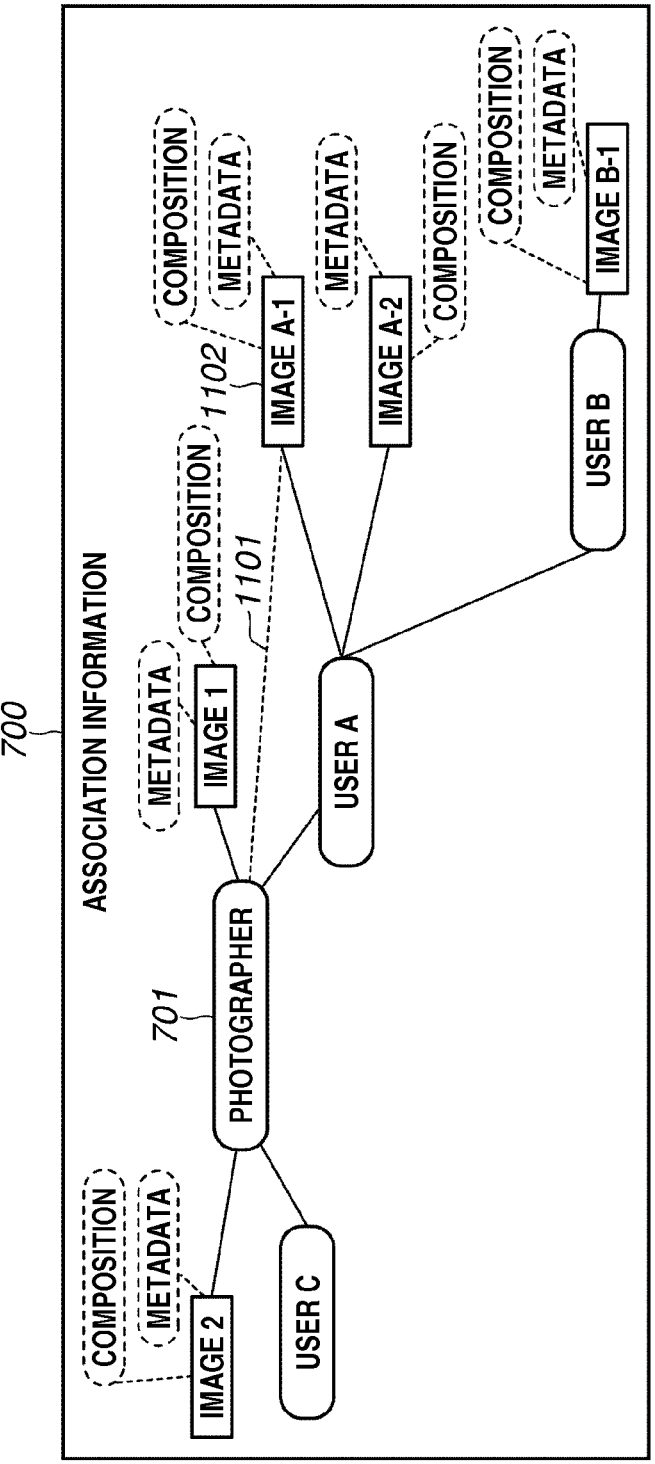
FIG. 11 illustrates an example of the association graph after execution of the association information update processing.

How the association information is updated will be described with reference to FIG. 11. Assuming that the photographer 701 has used shooting support information associated with an image 1102 (IMAGE A-1) in photographing support, the update unit 406 requests the SNS server 302 to increase the association between the photographer 701 and the image 1102. For example, the update unit 406 requests the SNS server 302 to change the association between them as if the photographer 701 directly evaluates the image 1102 on the SNS. This association information update processing results in establishment of a direct edge 1101 between the photographer 701 and the image 1102, and thereby results in a change from the degree of association $S_n=2$ before the photographing operation to the degree of association $S_n=1$, thereby increasing the degree of association between the photographer 701 and the image 1102.

In this way, according to the present embodiment, it is possible to provide photographing support with use of a more highly associated image based on association between a photographer and an image uploaded onto the SNS, which is established in the photographer's activity on the SNS. Further, since the association information is generated from an image based on a photographer's preference, taste, and interest about images, or an evaluation of another user, it is possible provide photographing support with use of an image that matches the photographer's preference, taste, and interest about images. Further, since the association information is updated to increase the degree of association with an image contained in shooting support information actually used in a photographing operation, it is possible to update the association information to further reflect the photographer's preference, taste, and interest.

The first embodiment has been described based on an example in which there is two types of evaluation, namely, "evaluated" or "not evaluated" as an evaluation on another user or an image on the SNS. A second embodiment will be described below as to photographing support processing and association information update processing in a case where there is a plurality of evaluation levels on the SNS.

Figure 12:
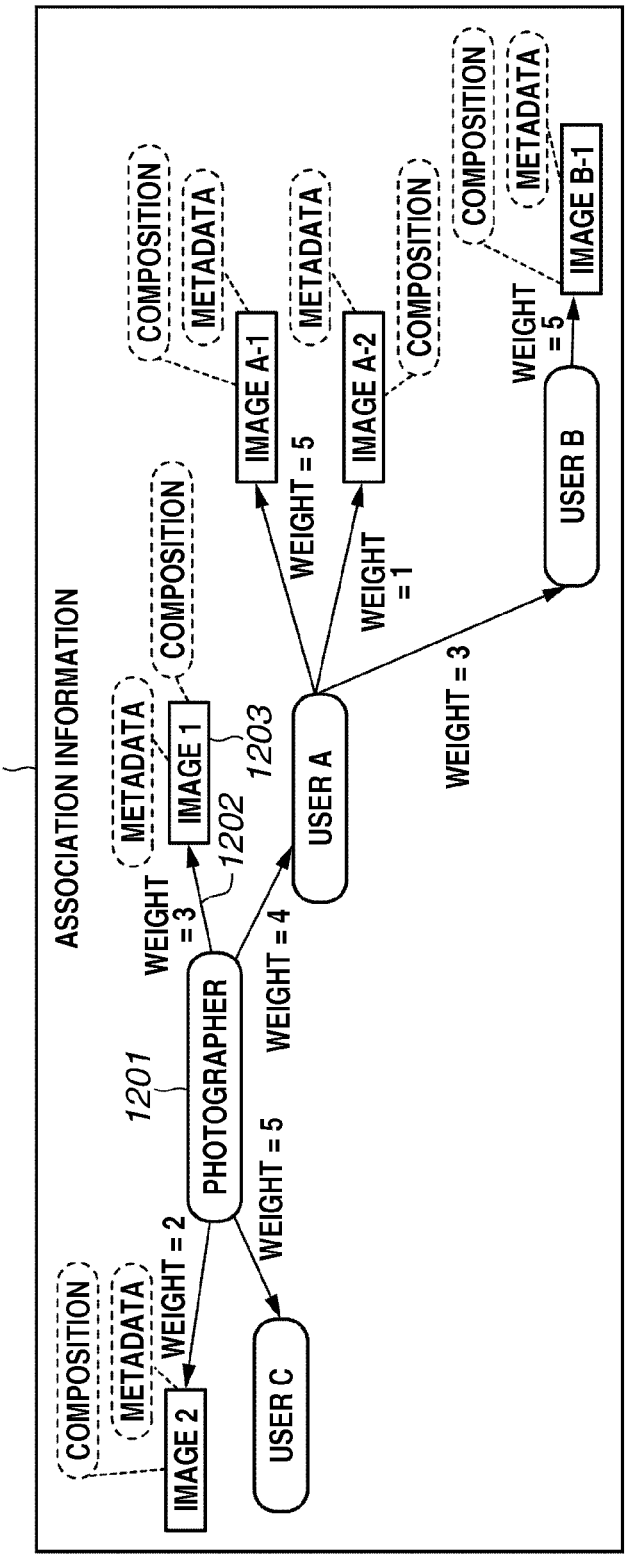
FIG. 12 illustrates an example of a weighted and oriented association graph.

FIG. 12 illustrates an association graph for use in calculation of an association degree according to the present embodiment. An association graph 1200 is expressed as a weighted and orientated graph in which an edge 1202 connecting nodes has a weight and a direction. The direction of an edge indicates which node establishes association between nodes. For example, in the relationship between a photographer 1201 and an image 1203 (IMAGE 1), the edge 1202 indicates that "PHOTOGRAPHER 1201", which is positioned at the starting point of the arrow, evaluates "IMAGE 1203", which is positioned at the ending point of the arrow. The direction of an edge is either unidirectional or bidirectional. The bidirection indicates that nodes at both sides evaluate each other. The weight of an edge is set to any of five levels, i.e., 1 to 5. A larger value of weight indicates that a higher degree of association is established between a node and another node connected via an arrowed edge. A photographer selects any of five levels as an evaluation on another user or an uploaded image on the SNS, to determine the value of this weight. If an edge connecting nodes are bidirectional, a weight is set to each of the directions.

The photographing support processing according to the present embodiment is different from the first embodiment in terms of calculation of the association degree, which will be described below in detail. In step S605 illustrated in FIG. 6, the analysis unit 403 of the server apparatus 100 calculates a degree of association with use of the association graph 1200. Assuming that n represents the number of hops between an arbitrary image node and the photographer node, and $x_i$ represents a weight assigned to each route edge i ($0<i<n$) in the association graph 1200, a degree of association $S_n$ between the photographer node and the image node is calculated by the following equation.

$$S_n = \min_{1 \le i \le n} \left( \sum_{i=1}^{n} \frac{1}{x_i} \right) \quad (2)$$

The smaller value an image node has as a value calculated by the equation (2), the higher association with the photographer.

Figure 13:
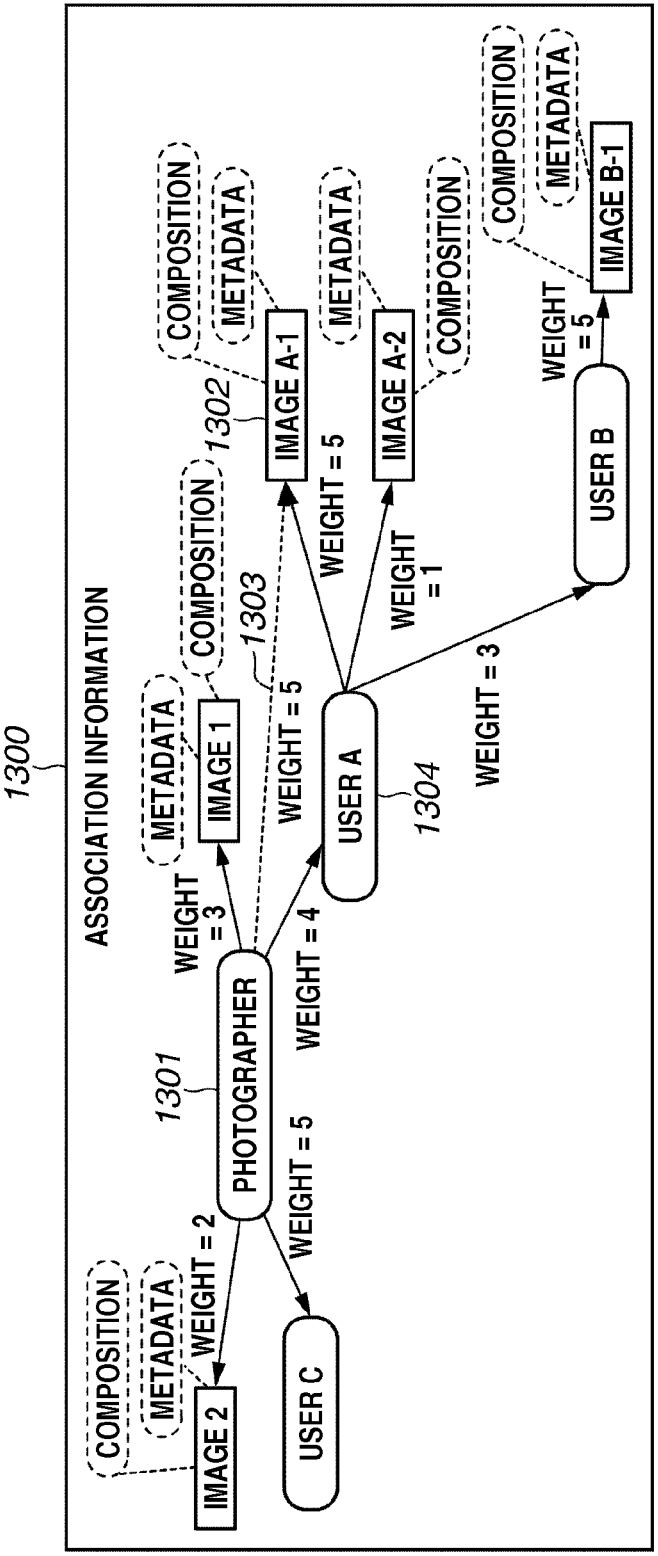
FIG. 13 illustrates an example of the weighted and oriented association graph after execution of the association information update processing.

Next, a difference of the association information update processing according to the present embodiment from the first embodiment will be described in detail. The association information update processing according to the present embodiment will be described with reference to FIG. 13. In a case where a photographer 1301 has used shooting support information associated with a recommended image 1302 as photographing support, in step S1006, the association information is updated such that the image 1302 becomes more closely associated with the photographer 1302. While the relationship between the photographer 1301 and the image 1302 is established via a user 1304, execution of the association information update processing results in formation of a direct connection between the photographer 1301 and the image 1302 via an edge 1303. At this time, the directly connecting edge 1303 is an edge showing a direction from the photographer node 1301 to the image 1302, and a weight 1303 of this edge is set to five according to the default setting.

At this time, while the distance from the photographer node 1301 to the image node 1302 is calculated as $S_n=9/20$ before the update processing, the distance from the photographer node 1301 to the image node 1302 is calculated as $S_n=1/5$, which is smaller than 9/20 (1/5<9/20), after the update processing. In this way, the distance between the nodes is reduced. The weight of the newly established edge 1303 is set to five according to the default setting, but the photographer may set this weight to an arbitrary value on the photographing apparatus 200.

In this way, according to the present embodiment, it is possible to provide photographing support with use of an image based on the association information more accurately reflecting a photographer's preference, taste, and interest by taking into consideration a weight of an evaluation that a photographer adds to an image.

A third embodiment supports image correction processing with use of an image that matches a user's image condition and is associated with the user, based on the user's preference and interest. The present embodiment will be described with reference to the drawings. The present embodiment will be described, assuming that image correction processing, such as gamma curve correction processing, spatial filter processing, skin color enhancement processing, red-eye processing, and color tone correction, is applied to images uploaded on the SNS. The present embodiment supports user's determination about what kind of correction should be applied to an image.

Figure 16:
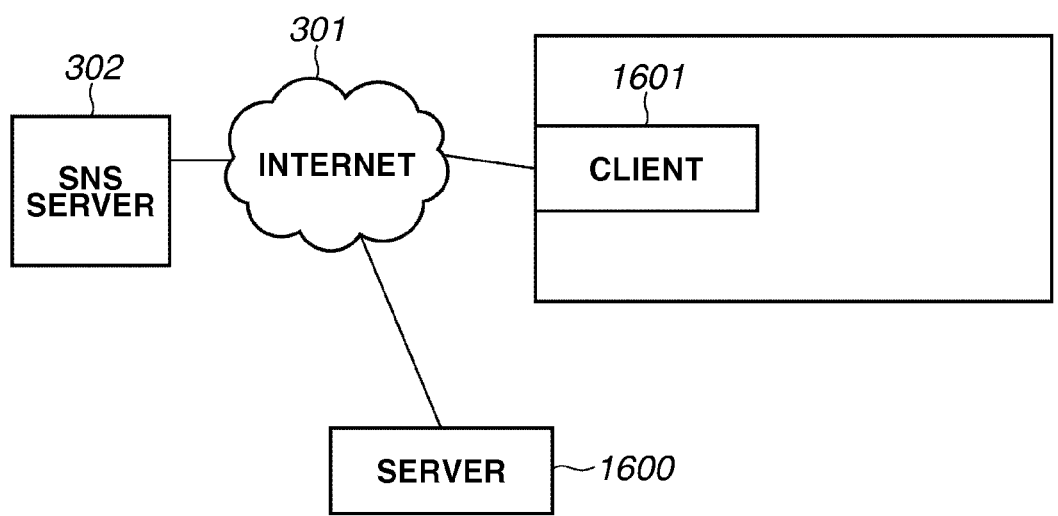
FIG. 16 illustrates an example of the system configuration according to a third embodiment.

The configuration of an image handling support system according to the present embodiment will be described with reference to FIG. 16. The image handling support system according to the present embodiment includes a server apparatus 1600, a client apparatus 1601, and the SNS server 302. The SNS server 302 is configured in a similar manner to the SNS server 302 in the first and second embodiments, and therefore a detailed description thereof will be omitted here.

The server apparatus 1600 is an information processing apparatus connected to a network such as the Internet 301 and capable of transmitting and receiving information. Further, the SNS server 302 is connected to the Internet 301, and the server apparatus 1600 can transmit/receive information to/from the SNS server 302 via the Internet 301. The system configuration illustrated in FIG. 16 is merely an example, and each apparatus may be constituted by physically similar apparatuses or plural kinds of apparatuses.

The hardware configuration of the server apparatus 1600 and the client apparatus 1601 is similar to the configuration illustrated in the block diagram of FIG. 1. The server apparatus 1600 in the present embodiment may be realized by a single computer apparatus or may be realized by distributing the respective functions among a plurality of computer apparatuses as necessary. In a case where the server apparatus 1600 is constituted by a plurality of computer apparatuses, theses apparatuses are connected via, for example, a Local Area Network (LAN) to be able to communicate with each other. Further, the image handling support system according to the present embodiment may be configured in such a manner that the server apparatus 1600 itself provides an SNS on the Internet 301.

Next, the functional configuration of the server apparatus 1600 will be described with reference to FIG. 17. The control unit 101 calculates and processes information, and controls each hardware apparatus based on the control program stored in the storage medium, which realizes the respective functional units of the server apparatus 1600. A part or all of the functional units, which will be described below, may be realized by hardware.

Figure 17:
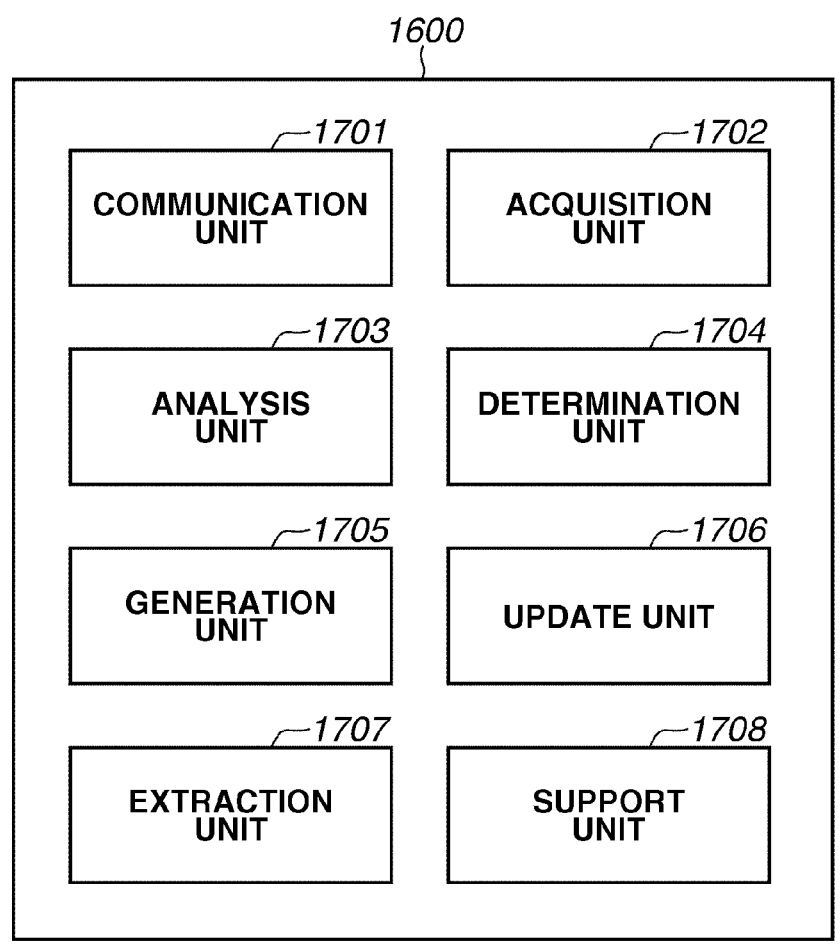
FIG. 17 illustrates an example of the configuration of a server apparatus according to the third embodiment.

As illustrated in FIG. 17, the functional configuration of the server apparatus 1600 includes a communication unit 1701, an acquisition unit 1702, an analysis unit 1703, a determination unit 1704, a generation unit 1705, and an update unit 1706. Further, the server apparatus 1600 includes an extraction unit 1707 and a support unit 1708.

The communication unit 1701 transmits/receives information to/from the client apparatus 1601, and communicates with the Internet 301. The acquisition unit 1702 acquires association information indicating association between a user and images from the SNS server 302 on the Internet 301. The analysis unit 1703 analyzes the association information acquired by the acquisition unit 1702, and calculates a degree of association between the user and an image, which indicates how much the image reflects the user's preference, taste and interest.

The determination unit 1704 determines whether an image matches a predetermined condition from metadata attached to the image or characteristics in the image for use in image handling support. In the present embodiment, the predetermined condition is based on a correspondence between images, i.e., a user's image and an image uploaded on the SNS server 302. For example, the determination unit 1704 determines whether the predetermined condition is satisfied between images based on similarity of objects between the images, similarity between photography locations of the images, or similarity between the color tones of the images.

The extraction unit 1707 extracts images that are likely to match the user's taste and interest from images uploaded on the SNS server 302 based on the information indicating the association between the user and images. For example, the extraction unit 1707 extracts an image uploaded by another person that evaluates an image evaluated by the user on the SNS. Further, the extraction unit 1707 extracts an image uploaded by another person evaluated further by another person evaluated by the user. Then, the extraction unit 1707 further extracts images about which the determination unit 1704 determines that there is a correspondence between the user's image and the image uploaded on the SNS server 302.

The generation unit 1705 generates support information with use of the images that match the predetermined condition, which are extracted by the extraction unit 1707 based on the result of the determination by the determination unit 1704 and the result of the analysis in which the analysis unit 1703 analyzes the association information. For example, the support information includes various kinds of parameters used at the time of processing (image processing) of the image extracted by the extraction unit 1707. The update unit 1706 updates the association information on the SNS server 302 based on a support history indicating whether image processing has been actually performed, with use of the generated support information. The support unit 1708 performs processing for supporting user's image handling processing based on the support information generated by the generation unit 1705.

Figure 18:
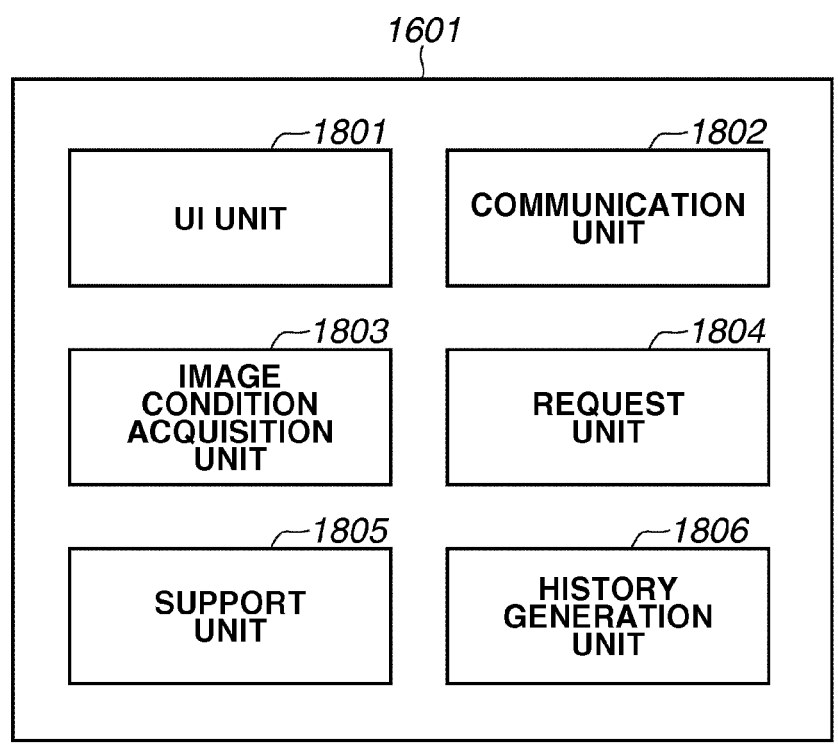
FIG. 18 illustrates an example of the configuration of a client apparatus according to the third embodiment.

Next, the functional configuration of the client apparatus 1601 will be described with reference to FIG. 18. The client apparatus 1601 can support a user based on the support information acquired from the server apparatus 1600. As illustrated in FIG. 18, the functional configuration of the client apparatus 1601 includes an UI unit 1801, a communication unit 1802, an image condition acquisition unit 1803, a request unit 1804, a support unit 1805, and a history generation unit 1806. The control unit 201 calculates and processes information, and controls the each hardware apparatus based on the control program stored in the storage medium, which realizes the respective functional units of the server apparatus 1600. A part or all of the functional units, which will be described below, may be realized by hardware.

The UI unit 1801 is an interface for enabling exchanges of information between the client apparatus 1601 and a user. The communication unit 1802 communicates with an external apparatus such as the server apparatus 1600. The image condition acquisition unit 1803 acquires, for example, image information and metadata of an image (support target image) that a user handles. The support unit 1805 presents the support information generated by the server apparatus 1600 in response to a request from the request unit 1804, to a user of the client apparatus 1601, thereby supporting image handling processing.

The request unit 1804 generates information that contains an image owned by a user and user information uniquely indicating the user, and requests the server apparatus 1600 to provide support. The history generation unit 1805 generates a support information use history, which is information indicating whether the user has actually used the support information.

How the thus-configured image handling support system functions will be described. Characteristic main processing of the image handling support system includes support processing and association information update processing. These kinds of processing will be described below with reference to the flowchart of FIG. 19, which is realized by execution of control programs by the respective apparatuses.

Figure 19:
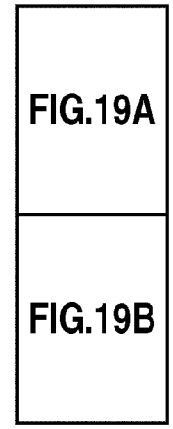
FIG. 19 is a flowchart illustrating support processing according to the third embodiment.
Figure 19A:
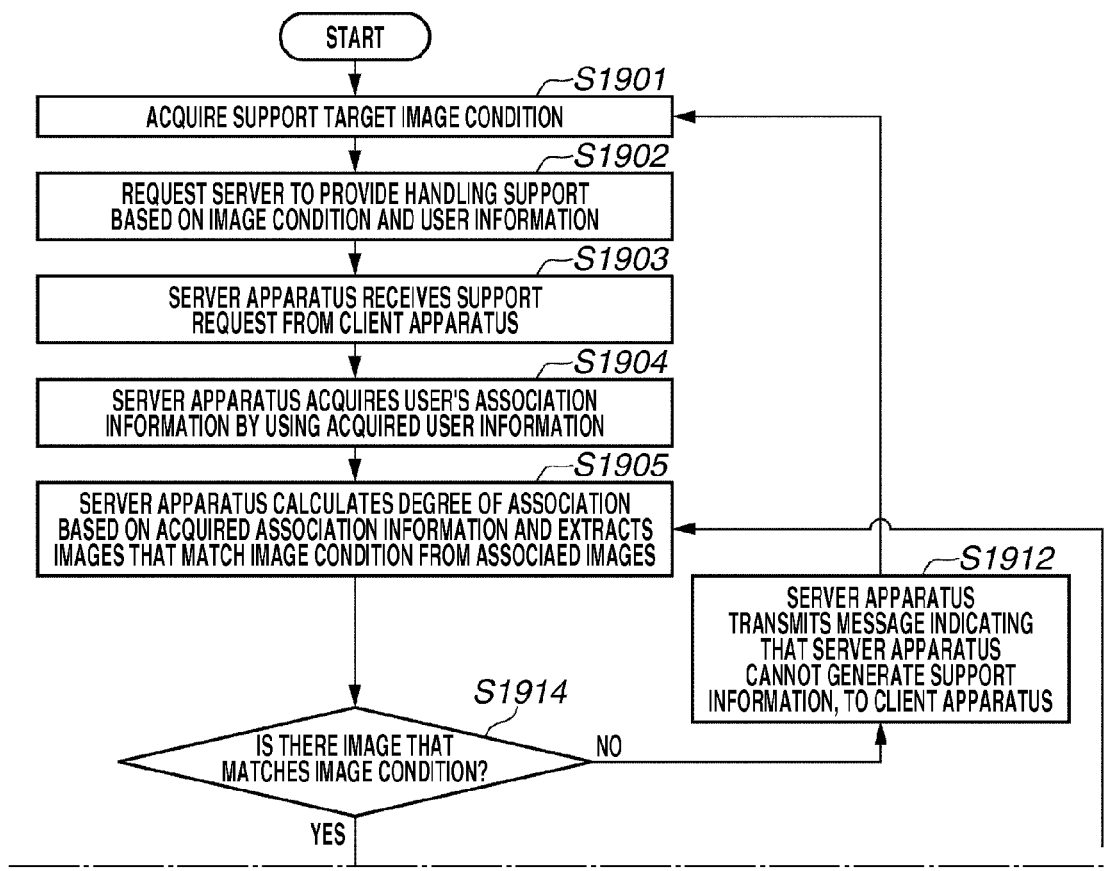
Figure 19B:
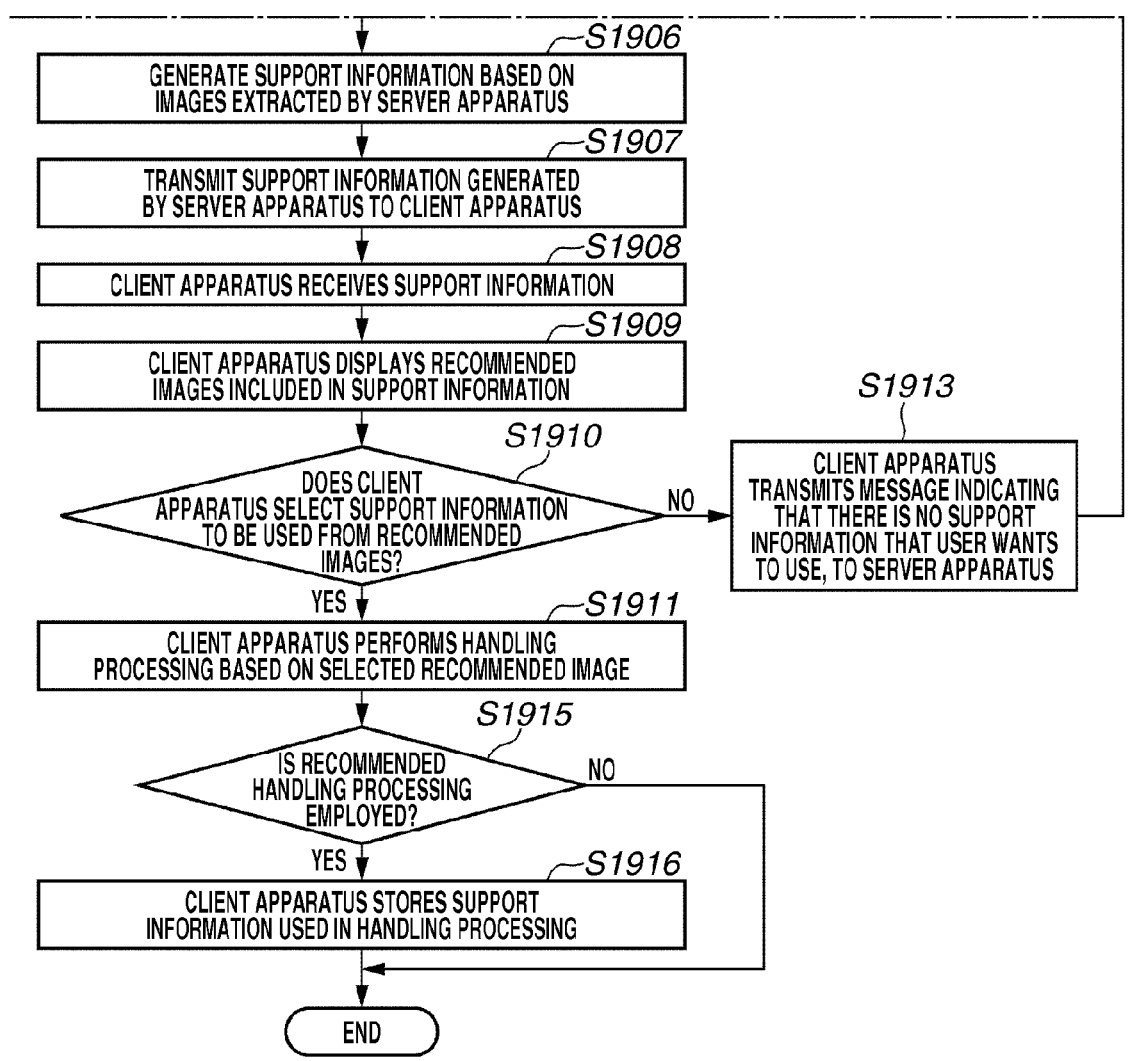

First, the support processing will be described with reference to FIG. 19. Upon a start of the support processing, first, in step S1901, the image condition acquisition unit 1803 of the client apparatus 1601 detects user's designation of a support target image for the UI unit 1801, and acquires an image condition of the designated image. In the present embodiment, an object appearing in the image is detected as the image condition. Examples of possible detected objects include a human, a landscape, a night view, an animal, and a building.

The present embodiment is described based on an example in which an object is detected as the image condition, but the present invention is not limited thereto. For example, an image characteristic amount such as a histogram, which is an index quantitatively expressing characteristics of an image, an edge amount, the position and size of a human's face, and a red eye may be detected as the image condition. Further, positional information attached to the support target image, which is an output of a sensor of a Global Positioning System (GPS), for example, and a photography date/time may be detected as the image condition.

Subsequently, in step S1902, the request unit 1804 of the client apparatus 1601 generates a support request that contains information about the image condition acquired as an output in step S1901, and information uniquely indicating the user which is acquired from an input that the user provides to the UI unit 1801. The user ID of the SNS server 302 is used as the information uniquely indicating the user. The request unit 1804 of the client apparatus 1601 generates the support request, and transmits this information to the server apparatus 1600 via the communication unit 1802. In step S1903, the server apparatus 1600 receives the support request.

Subsequently, in step S1904, the acquisition unit 1702 of the server apparatus 1600 accesses the SNS server 302 via the Internet 301, and acquires the user's association information with use of the user ID contained in the support request received in step S1903. The SNS server 302 has the function of outputting the user's association information corresponding to an input user' ID to the input source.

Figure 20:
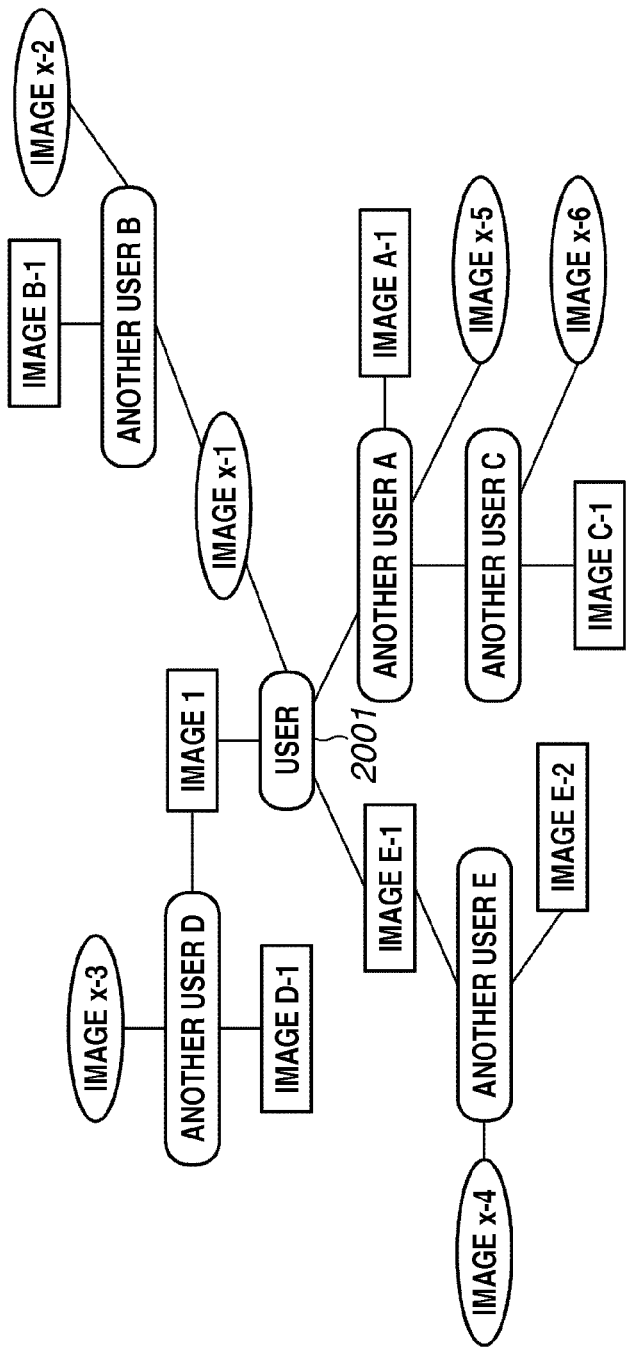
FIG. 20 illustrates an example of an association graph according to the third embodiment.

FIG. 20 illustrates an association graph indicating degrees of association between a user and other users or images based on the acquired association information. The association graph is a graph in which a user 2001 of the present system, other users active on the SNS, and images uploaded on the SNS are expressed as nodes, and association is indicated with use of edges connecting the nodes. The association graph indicates there is association between nodes connected via an edge. Association between nodes is established by an activity such as following another user active on the SNS, providing a "like" evaluation to an uploaded image, and providing a "like" evaluation (appreciation, preference) to another user.

In the association graph illustrated in FIG. 20, "IMAGE 1" is an image uploaded by the user 2001 (a user of the image handling support system). "ANOTHER USER D" (a user on the SNS) is a person that favorably evaluates the image 1 on the SNS, which is uploaded by the user 2001. "IMAGE X-3" is an image favorably evaluated by the another user D on the SNS. Further, "IMAGE D-1" is an image uploaded by the another user D. It is highly likely that these images, the image 1, the image D-1, and the image X-3 meet the preference of the user 2001, and therefore association is established between each of them and the user 2001.

"IMAGE X-1" is an image directly favorably evaluated by the user 2001 on the SNS. "ANOTHER USER B" is a person that also favorably evaluates the image X-1 on the SNS, which is evaluated by the user 2001 on the SNS. Further, "IMAGE B-1" is an image uploaded by the another user B onto the SNS. "IMAGE X-2" is an image favorably evaluated by another user B on the SNS. It is highly likely that these images, the image X-1, the image B-1, and the image X-2 meet the preference of the user 2001, and therefore association is established between each of them and the user 2001.

"ANOTHER USER A" is a person that the user 2001 favorably evaluates based on an image uploaded by the another user A and the activity on the SNS. Further, "IMAGE A-1" is an image uploaded by another user A onto the SNS. "IMAGE X-5" is an image favorably evaluated by the another user A on the SNS. "ANOTHER USER C" is a person directly favorably evaluated by the another user A on the SNS, which is directly favorably evaluated by the user 2001 on the SNS. "IMAGE X-6" is an image favorably evaluated by the another user A on the SNS. "IMAGE C-1" is an image uploaded by the another user C onto the SNS. It is highly likely that these images, the image A-1, the image X-5, the image X-6, and the image C-1 meet the preference of the user 2001, and therefore association is established between each of them and the user 2001.

"IMAGE E-1" is an image directly favorably evaluated by the user 2001 on the SNS. Further, the image E-1 is an image uploaded by "ANOTHER USER E" (a user on the SNS) onto the SNS. Similarly, "IMAGE E-2" is an image uploaded by the another user E onto the SNS. "IMAGE X-4" is an image favorably evaluated by the another user E on the SNS. It is highly likely that these images, the image E-1, the image E-2, and the image X-4 meet the preference of the user 2001, and therefore association is established between each of them and the user 2001.

Subsequently, in step S1905, the analysis unit 1703 of the server apparatus 1600 calculates a degree of association between the user and an image on the SNS based on the acquired association information. Further, the determination unit 1704 determines whether the associated image on the SNS matches the image condition acquired in step S1901. Then, the extraction unit 1707 extracts images that match the image condition of the support target image.

In the present embodiment, the degree of association is also calculated by using the above-described equation (1). Each degree of association between the user 2001 and the image nodes corresponding to the other users on the SNS illustrated in FIG. 20 is as follows. The degree of association of the image D-1 is 3, the degree of association of the image X-3 is 3, the degree of association of the image X-1 is 1, the degree of association of the image B-1 is 3, and the degree of association of the image X-2 is 3. Similarly, the degree of association of the image A-1 is 2, the degree of association of the image X-5 is 2, the degree of association of the image X-6 is 3, the degree of association of the image C-1 is 3, the degree of association of the image E-1 is 1, the degree of association of the image E-2 is 3, and the degree of association of the image X-4 is 3.

The determination unit 1704 determines whether the images on the SNS determined to be associated with the user match the image condition acquired in step S1901. The determination unit 1704 determines whether the images having a degree of association within a predetermined range set in advance match the image condition contained in the support request, starting from the image having the highest degree of association. The determination unit 1704 determines whether an image on the SNS matches the image condition of the support target image by determining whether the objects in the images are similar.

The determination unit 1704 performs known object determination processing based on the image information to detect an object in the image. Then, the determination unit 1704 determines whether there is a corresponding object in common between the support target image and the image on the SNS.

For example, in a case where a human is detected from the support target image as the image condition, if the human is also detected in the image uploaded on the SNS, the determination unit 1704 determines that an image on the SNS matches the image conditions of the support target image. Alternatively, the determination unit 174 may determine whether an image on the SNS matches the image condition of the support target image by using GPS information of the images. Further, the image handling support system may be configured such that the image condition is set based on, for example, a photography location, a photography time, and a photography parameter.

The extraction unit 1707 extracts images uploaded on the SNS that match the image condition from images having a degree of association within an arbitrary range. Then, in step S1914, the extraction unit 1707 determines whether there is any extracted image that matches the image condition. If there is no image that matches the image condition (NO in step S1914), in step S1912, the server apparatus 1600 transmits a message indicating that the server apparatus 1600 cannot return the support information to the client apparatus 1601. The client apparatus 1601 displays that message on the UI unit 1801. Then, the processing proceeds to step S1901 again, which requests setting of a new image condition, and then steps thereafter are repeated based on this new image condition.

Alternatively, the image handling support system may be configured in such a manner that a determination is made again, expanding the target to include images having a lower degree of association, or image handling support is provided with use of an image stored in the server apparatus 1600 in advance.

On the other hand, if it is determined in step S1914 that there is an image that matches the image condition (YES in step S1914), the processing proceeds to step S1906. In step S1906, if there are images (recommended images) that match the image condition, the generation unit 1705 of the server apparatus 1600 generates support information based on the recommended images. As an example of the support information, the support information generated at this time may be, for example, information for correcting the support target image based on the order of image processing applied to the recommended image or parameters regarding each processing.

Alternatively, the support information may be image data of the recommended image before the application of image correction and image data of the recommended image after the application of image correction. Further alternatively, the support information may be the group of recommended images itself. The above-described support information is merely an example, and the present invention is not limited thereto.

Subsequently, in step S1907, the support unit 1708 of the server apparatus 1600 transmits the support information generated in step S1906 to the client apparatus 1601 via the communication unit 1701. In step S1908, the client apparatus 1601 receives the support information. Subsequently, in step S1909, the client apparatus 1601 presents the recommended images contained in the support information received in step S1908, on the UI unit 1801. The list of images 804 to be displayed may be images that would result from application of correction to the support target image according to the image correction procedures applied to the recommended images.

At this time, the recommended images are displayed in such a manner that they are sorted in the descending order of the degree of association between the image and the user. In step S1910, it is determined whether selection of a recommended image for use in actual correction processing is detected based on a user's instruction. In step S1910, the UI unit 1801 determines whether the support information for use in correction is selected from the recommended images. If there is no image that the user wants to use (NO in step S1910), the user operates the UI unit 1801 to indicate this intention. Then, in step S1913, the client apparatus 1601 transmits a message indicating that there is no support information that the user wants to use, to the server apparatus 1600.

Upon receiving this message, the server apparatus 1600 resets the preset and predetermined degree of association, based on which it is determined whether the image matches the image condition, so that the recommended images can contain images having a lower degree of association. Then, step S1905 and the steps thereafter are repeated.

On the other hand, if the user selects an arbitrary image from the recommended images presented on the UI unit 1801 in step S1910 (YES in step S1910), in step S1911, the support unit 1805 of the client apparatus 1601 applies image correction applied to the selected recommended image also to the support target image, and presents the preview image thereof to the user via the UI unit 1801. After the support unit 1805 of the client apparatus 1601 provides the support, in step S1915, if the client apparatus 1601 stores the support target image with the image correction applied thereto (YES in step S1915), in step S1916, the client apparatus 1601 stores information about the support information used in the correction. Then, the processing is ended.

Next, association information update processing will be described. It is considered that the recommended image actually used by the user as support more closely matches the user's taste and preference. The association information on the SNS is updated by using this information to more accurately reflect the user's preference and taste. The association information update processing according to the present embodiment is similar to the one according to the first embodiment, and therefore the description thereof will be omitted here.

In this way, according to the present embodiment, it is possible to provide image handling support with use of a more highly associated image based on association between the user and the image uploaded onto the SNS, which is established from the user's activity on the SNS. In particular, since the association information is generated from an image based on the user's preference, taste, and interest about images, or an evaluation on another user, it is possible provide image handling support with use of an image that matches the user's preference, taste, and interest about images.

Other Embodiments

As another embodiment, the present invention can be also carried out by performing the following processing, i.e., providing a system or an apparatus with software (program) capable of realizing the functions of the above-described embodiments, via a network or various kinds of storage media, and causing a computer (or, for example, a CPU or a micro processing unit (MPU)) of the system or the apparatus to read out and execute the program.

While the present invention has been described with reference to embodiments, it is to be understood that the invention is not limited to the disclosed embodiments.

This application claims priority from Japanese Patent Application No. 2011-132278 filed Jun. 14, 2011, and No. 2012-113473 filed May 17, 2012, which are hereby incorporated by reference herein in their entirety.

What is claimed is:

1. An information processing system comprising:
one or more computer-readable media; and
one or more processors that are coupled to the one or more computer readable media and that are configured to:
acquire association information indicating a plurality of images that are favorably evaluated by a second user who is associated with a first user, the association information defining an association graph in which each of a plurality of users including the first user and of the plurality of images uploaded onto an image sharing service is expressed as a respective node;
calculate degrees of association between the first user and a plurality of the nodes based on information indicating distances among the plurality of the nodes according to the information related to the association graph, wherein a distance between two nodes is based on a number of hops between the two nodes;
determine images within a predetermined degree of association with the first user;
extract an image to be presented to the first user from the determined images, the extracted image having a similar photographing condition under which photographing has been performed, such that images are sequentially extracted starting from an image corresponding to a node having a highest degree of association with the first user, or
extract an image to be presented for an image processing on a first image from the determined images, the extracted image being similar to the first image, such that images are sequentially extracted starting from an image corresponding to the node having a highest degree of association with the first user;
re-extract an image that has a lower degree of association with the first user than the predetermined degree of association of the images in response to a message indicating that no image is selected by the first user; and
control an apparatus corresponding to the first user to display the extracted image or the re-extracted image, in a case that the first user performs photographing or the image processing on the first image.

2. The information processing system according to claim 1, wherein the one or more processors are further configured to select any of the extracted images.

3. The information processing system according to claim 2, wherein the one or more processors are further configured to
calculate degrees of association between the first user and the plurality of images based on the association information;
sort the extracted images into a sorting order based on the calculated degrees of association between the first user and the plurality of images; and
cause a display unit to display the extracted images in the sorting order,
wherein the one or more processors are further configured to select any of the displayed images.

4. The information processing system according to claim 1, wherein the one or more processors are further configured to update the association information based on a displayed image in a case where the first user performs photographing or where the image processing that was executed on the first image is executed on the image which is displayed.

5. The information processing system according to claim 1, wherein the one or more processors are further configured to
acquire the photographing condition from a photographing apparatus to be used for photographing by the first user; and
set a photographing parameter used when one of the extracted images selected by the first user was photographed by the photographing apparatus,
wherein the extracted images correspond to the photographing condition.

6. The information processing system according to claim 1, wherein the one or more processors are further configured to extract an image that includes an object that corresponds to an object in the first image.

7. The information processing system according to claim 1, wherein the information processing system comprises at least a server apparatus and a client apparatus,
wherein the image sharing service is a social networking service,
wherein the association information indicates associations between the first user and images uploaded in the social networking service, and
wherein the one or more processors are further configured to extract an image that coincides with one of a photographing condition of the photographing apparatus used for photographing by the first user, a color tone of the first image, or an object of the first image.

8. The information processing system according to claim 1, wherein the image sharing service is a social networking service.

9. The information processing system according to claim 1, wherein the one or more processors are further configured to extract images and control the apparatus corresponding to the first user to superimpose and display a photography preview and extracted images sorted based on degrees of association between the first user and the extracted images or to superimpose and display the first image and extracted images sorted based on the degrees of association between the first user and the extracted images, wherein each of the images is obtained by executing the image processing that was executed on each of the extracted images on the first image.

10. The information processing system according to claim 1, wherein the distance between the two nodes is inversely related to the number of hops between the two nodes.

11. An information processing apparatus comprising:
one or more computer-readable media; and
one or more processors that are coupled to the one or more computer-readable media and that are configured to:
acquire association information indicating a plurality of images that are favorably evaluated by a second user who is associated with a first user, the association information defining an association graph in which each of a plurality of users including the first user and of the plurality of images uploaded onto an image sharing service is expressed as a respective node;
calculate degrees of association between the first user and a plurality of the nodes based on information indicating distances among the plurality of the nodes according to the information related to the association graph, wherein a distance between two nodes is based on a number of hops between the two nodes;
determine images within a predetermined degree of association with the first user;

extract an image to be presented to the first user from the determined images, the extracted image having a similar photographing condition under which the photographing has been performed, such that images are sequentially extracted starting from an image corresponding to a node having a highest degree of association with the first user, or extract an image to be presented for an image processing on a first image from the determined images, the extracted image being similar to the first image such that images are sequentially extracted starting from an image corresponding to a node having the highest degree of association with the first user;

re extract an image that has a lower degree of association with the first user than the predetermined degree of association of the images in response to a message indicating no image is selected by the first user; and transmit, to an apparatus corresponding to the first user, the extracted image or re-extracted image to be displayed, in a case that the first user performs photographing or the image processing on the first image.

12. The information processing system according to claim 11, wherein the distance between the two nodes is further based on respective weights that are assigned to each hop between the nodes.

13. The information processing system according to claim 12, wherein the distance between the two nodes is inversely related to the respective weights that are assigned to each hop between the nodes.

14. The information processing system according to claim 13, wherein the one or more processors are further configured to calculate the degree of association between the first user and a node of the plurality of the nodes according to $$S_n = \min_{1 \le i \le n}\left(\sum_{i=1}^{n} \frac{1}{x_i}\right),$$

where $S_n$ is the degree of association, where $x_i$ is a respective weight that is assigned to a hop, and where n is a number of hops between the first user and the node.

15. An information processing method comprising:

acquiring association information indicating a plurality of images that are favorably evaluated by a second user who is associated with a first user, the association information defining an association graph in which each of a plurality of users including the first user and of the plurality of images uploaded onto an image sharing service is expressed as a respective node;

calculating degrees of association between the first user and a plurality of the nodes based on information indicating distances among the plurality of the nodes according to the information related to the association graph, wherein a distance between two nodes is based on a number of hops between the two nodes;

determining images within a predetermined degree of association with the first user;

extracting an image to be presented to the first user from the determined images, the extracted image having a similar photographing condition under which the photographing has been performed, such that images are sequentially extracted starting from an image corresponding to a node having a highest degree of association with the first user, or extracting an image to be presented for an image processing on a first image from the determined images, the extracted image being similar to the first image, such that images are sequentially extracted starting from an image corresponding to a node having the highest degree of association with the first user;

re extracting an image that has a lower degree of association with the first user than the predetermined degree of association of the determined images in response to a message indicating that no image is selected by the first user, thereby generating a re-extracted image; and controlling an apparatus corresponding to the first user to display the extracted image or the re-extracted image, in a case that the first user performs photographing or the image processing on the first image.

16. A non-transitory storage medium storing a program causing a computer to execute the information processing method according to claim 15.

* * * * *